United States Patent
Raymer et al.

(10) Patent No.: US 11,038,618 B2
(45) Date of Patent: Jun. 15, 2021

(54) DE-MULTIPLEXER AND METHOD OF SEPARATING MODES OF ELECTROMAGNETIC RADIATION

(71) Applicants: Oxford University Innovation Limited, Oxford (GB); University of Oregon, Eugene, OR (US)

(72) Inventors: Michael Raymer, Eugene, OR (US); Dylan Saunders, Oxford (GB); Joshua Nunn, Oxford (GB); Benjamin Brecht, Oxford (GB); Ian Walmsley, Oxford (GB)

(73) Assignees: OXFORD UNIVERSITY INNOVATION LIMITED, Oxford (GB); UNIVERSITY OF OREGON, Eugene, OR (US)

( * ) Notice: Subject to any disclaimer, the term of this patent is extended or adjusted under 35 U.S.C. 154(b) by 0 days.

(21) Appl. No.: 16/770,120

(22) PCT Filed: Dec. 11, 2018

(86) PCT No.: PCT/GB2018/053587
§ 371 (c)(1),
(2) Date: Jun. 5, 2020

(87) PCT Pub. No.: WO2019/116019
PCT Pub. Date: Jun. 20, 2019

(65) Prior Publication Data
US 2020/0351007 A1    Nov. 5, 2020

Related U.S. Application Data

(60) Provisional application No. 62/597,231, filed on Dec. 11, 2017.

(30) Foreign Application Priority Data

Jan. 12, 2018  (GB) ..................... 1800566

(51) Int. Cl.
*H04J 14/04*     (2006.01)
*G02F 1/21*      (2006.01)

(52) U.S. Cl.
CPC ............. *H04J 14/04* (2013.01); *G02F 1/21* (2013.01); *G02F 1/212* (2021.01)

(58) Field of Classification Search
None
See application file for complete search history.

(56) References Cited

U.S. PATENT DOCUMENTS

| 6,769,816 B2 * | 8/2004 | Capewell | ........... G02B 6/29367 385/24 |
| 2002/0064191 A1 * | 5/2002 | Capewell | ........... G02B 6/29367 372/14 |

(Continued)

OTHER PUBLICATIONS

Liron Stern et al: "Controlling the interactions of space-variant polarization beams with rubidium vapor using external magnetic fields", OSA, vol. 24, No. 5, Feb. 25, 2016 (Feb. 25, 2016), p. 4834. (Year: 2016).*

(Continued)

*Primary Examiner* — Darren E Wolf
(74) *Attorney, Agent, or Firm* — Thomas|Horstemeyer, LLP

(57) ABSTRACT

A de-multiplexer (1) for separating two co-propagating modes of electromagnetic radiation includes a volume (2) having a path therethrough for receiving electromagnetic radiation, an input (8) for directing two co-propagating modes of electromagnetic radiation to be incident upon the volume, a control source (12) of electromagnetic radiation arranged to generate a time-dependent control field. The volume is arranged and the time-dependent control field is shaped such that, when the two co-propagating modes of electromagnetic radiation and the time-dependent control field are incident upon the volume contemporaneously, the (Continued)

time-dependent control field causes the volume to accept one of the two modes of electromagnetic radiation onto a mode of the volume without any parametric non-linear optical interaction taking place and to reflect or transmit the other of the two modes of electromagnetic radiation, so to spatially and/or temporally separate the two modes of electromagnetic radiation from each other.

20 Claims, 6 Drawing Sheets

(56) References Cited

U.S. PATENT DOCUMENTS

| | | | |
|---|---|---|---|
| 2003/0077029 A1* | 4/2003 | Basu | G02B 6/2931 385/24 |
| 2004/0101247 A1* | 5/2004 | Chen | G02B 6/32 385/47 |
| 2010/0215310 A1 | 8/2010 | Ishikawa et al. | |
| 2015/0043910 A1 | 2/2015 | Koebele et al. | |
| 2016/0191192 A1* | 6/2016 | Yue | G02B 6/2938 398/83 |

OTHER PUBLICATIONS

International Search Report and Written Opinion for PCT/GB2018/053587, dated Jul. 3, 2019, pp. 1-11.
UK Search Report for GB 1800566.0, dated Jul. 5, 2018, pp. 1-6.
Dileep V Reddy et al: "Photonic temporal-mode multiplexing by quantum frequency conversion in a dichroic-finesse cavity", Physical Review Letters Opt. Express Phys. Rev. Lett. Opt. Express New Journal of Physics New Journal of Physics Optics Express Opt. Express Optics Letters, Aug. 4, 2017 (Aug. 4, 2017), pp. 15959-15973.
Andrea Annon et al: "Unscrambling light-automatically undoing strong mixing between modes", Light: Science & Applications, vol. 6, No. 12, Jun. 30, 2017 (Jun. 30, 2017), p. e17110.
Shuhui Li et al: "Simultaneousdemultiplexing and steering of multiple orbital angular momentum modes", Scientific Reports, vol. 5, No. 1, Oct. 27, 2015 (Oct. 27, 2015).
Christoph Simon et al: "Temporally multiplexed quantum repeaters with atomic gases", Physical Review A (Atomic, Molecular, and Optical Physics), vol. 82, No. 1, Jul. 1, 2010 (Jul. 1, 2010).
D.J. Saunders et al: "Cavity-Enhanced Room-Temperature Broadband Raman Memory", Physical Review Letters,vol. 116, No. 9, Mar. 1, 2016 (Mar. 1, 2016).
Optics Communications, vol. 256, Jan. 12, 2005, Elsevier, Amsterdam, Hui Wang, Jian Wu & Jintong Lin, "Performance analysis on terahertz optical asymmetric demultiplexer with assist light injection", pp. 83-97.
Richardson et al., "Space-division multiplexing in optical fibres", Nature Photonics, vol. 7, 2013.
Reddy et al., "Temporal mode selectivity by frequency conversion in second-order nonlinear optical waveguides", Optics Express, vol. 21, No. 21, 2013.
Nunn et al., "Bad Cavities for Good Memories: Storing Broadband Photons with Low Noise", 2015 Conference on Lasers and Electro-Optics (CLEO).
Bozinovic et al., "Terabit-Scale Orbital Angular Momentum Mode Division Muliplexing in Fibers", Science Magazine, vol. 240, 2013.

* cited by examiner

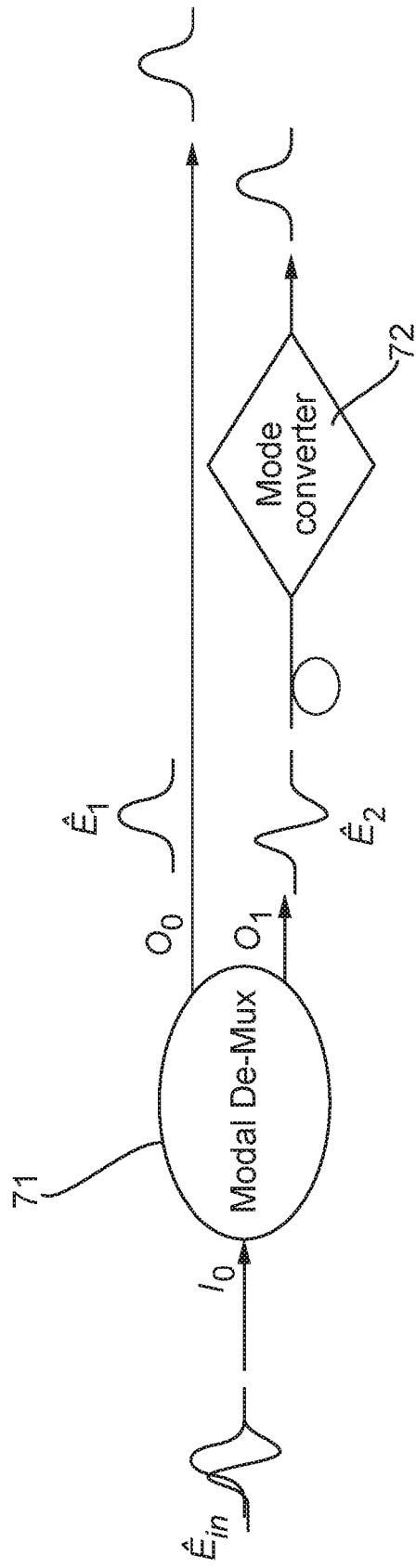

DE-MULTIPLEXER AND METHOD OF SEPARATING MODES OF ELECTROMAGNETIC RADIATION

CROSS-REFERENCE TO RELATED APPLICATIONS

This application is the National Stage of International Application No. PCT/GB2018/053587, filed Dec. 11, 2018, which claims priority to U.S. 62/597,231, filed Dec. 11, 2017 and GB 1800566.0, filed Jan. 12, 2018, which are entirely incorporated herein by reference.

This invention was made with US government support under grant #1521466 awarded by the National Science Foundation. The US government has certain rights in the invention.

This invention relates to a de-multiplexer for separating modes of electromagnetic radiation, in particular to a de-multiplexer for separating two modes of co-propagating electromagnetic radiation where the electric fields of the two modes are orthogonal to each other.

Telecommunications signals are transmitted as encoded signals, with two or more modes of electromagnetic radiation typically encoded and transmitted together, in order to increase the data transfer rate for the available bandwidth when the signals are transmitted. Dividing the capacity of the data transfer medium (e.g. an optical fibre or wireless transmission) into multiple modes may be achieved by using intensity orthogonal states, owing to conventional detectors (that are used for receiving and decoding the transmitted signals) being able to measure the intensity of incident electromagnetic radiation. Thus, such detectors are able to separate (i.e. de-multiplex and thus decode) multiple modes of electromagnetic radiation that have been multiplexed and transmitted in this way, so that the original component signals (modes) of the electromagnetic radiation that carry the information that was encoded into the transmitted signal.

Such devices and methods of encoding, transmitting and decoding electromagnetic radiation signals are not able to increase the data transfer rate much further, owing to maximal use of the phase space for such intensity orthogonal modes, e.g. in single mode optical fibres.

The aim of the present invention is to provide improved devices and methods for de-multiplexing modes of electromagnetic radiation.

When viewed from a first aspect the invention provides a de-multiplexer for separating two co-propagating modes of electromagnetic radiation, wherein the electric fields of the two modes of electromagnetic radiation are orthogonal to each other, wherein the de-multiplexer comprises:

a volume comprising a path therethrough for receiving electromagnetic radiation;

an input for directing two co-propagating modes of electromagnetic radiation to be incident upon the volume, wherein the electric fields of the two modes of electromagnetic radiation are orthogonal to each other;

a control source of optical or microwave electromagnetic radiation arranged to generate a time-dependent control field, wherein the time-dependent control field from the control source is arranged to be incident upon the volume and to overlap both contemporaneously and spatially with the two co-propagating modes of electromagnetic radiation;

wherein the volume is arranged and the time-dependent control field is shaped such that, when the two co-propagating modes of electromagnetic radiation and the time-dependent control field are incident upon the volume contemporaneously, the time-dependent control field causes the volume to accept one of the two modes of electromagnetic radiation onto a mode of the volume without any parametric non-linear optical interaction taking place and to reflect or transmit the other of the two modes of electromagnetic radiation, so to spatially and/or temporally separate the two modes of electromagnetic radiation from each other.

When viewed from a second aspect the invention provides a method of separating two co-propagating modes of electromagnetic radiation, wherein the electric fields of the two modes of electromagnetic radiation are orthogonal to each other, wherein the method comprises:

directing two co-propagating modes of electromagnetic radiation to be incident upon a volume, wherein the electric fields of the two modes of electromagnetic radiation are orthogonal to each other and the volume comprises a path therethrough for receiving electromagnetic radiation;

shaping and directing a time-dependent control field of optical or microwave electromagnetic radiation to be incident upon the volume and to overlap both contemporaneously and spatially with the two co-propagating modes of electromagnetic radiation;

wherein the volume is arranged and the time-dependent control field is shaped such that, when the two co-propagating modes of electromagnetic radiation and the time-dependent control field are incident upon the volume contemporaneously, the time-dependent control field causes the volume to accept one of the two modes of electromagnetic radiation onto a mode of the volume without any parametric non-linear optical interaction taking place and to reflect or transmit the other of the two modes of electromagnetic radiation, so to spatially and/or temporally separate the two modes of electromagnetic radiation from each other.

The present invention therefore provides a de-multiplexer for and a method of separating two co-propagating modes of electromagnetic radiation, for two modes of electromagnetic radiation that have their electric fields orthogonal to each other. The de-multiplexer includes a volume for receiving electromagnetic radiation (e.g. one or both of the two co-propagating modes) along a path through the volume.

The de-multiplexer also includes an input for directing two co-propagating, temporal field orthogonal modes of electromagnetic radiation (i.e. two modes that are desired to be separated) to be incident upon the volume, e.g. such that one or both of the two co-propagating modes are directed along the path through the volume.

The de-multiplexer further includes a control source of electromagnetic radiation which generates a time-dependent control field. The time-dependent control field from the control source is arranged to be incident upon the volume such that it overlaps both in space and time with the incidence of the two co-propagating modes of electromagnetic radiation on the volume.

The de-multiplexer is configured (i.e. the volume is arranged and the time-dependent control field is shaped) such that when the two co-propagating modes of electromagnetic radiation and the time-dependent control field are incident at the same time upon the volume, the time-dependent control field causes the one of the two co-propagating modes of electromagnetic radiation to be selected and the volume to accept this one of the two modes of electromagnetic radiation onto a mode of the volume (i.e. this mode thus travels along the path through the volume) that is free from parametric non-linear optical interactions.

Owing to the de-multiplexer operating without any parametric non-linear optics, the volume operates non-parametrically (i.e. energy is left in the volume during operation of the de-multiplexer) when one of the two co-propagating modes of electromagnetic radiation is accepted onto a mode of the volume. This helps to allow the de-multiplexer to separate the two co-propagating modes of electromagnetic radiation.

When the volume accepts one of the two modes of electromagnetic radiation onto a mode of the volume, the volume reflects or transmits the other of the two modes of electromagnetic radiation (i.e. the other mode is not accepted by the volume). This has the effect of the de-multiplexer spatially and/or temporally separating the two modes of electromagnetic radiation from each other, thus allowing them to be detected separately for decoding.

Thus it will be appreciated that the de-multiplexer of the present invention provides a device that is able to separate temporally orthogonal modes of electromagnetic radiation temporally and/or spatially, owing to the mode selective time-dependent control field acting on the volume in a way that is free from parametric classical non-linear optics. Thus the de-multiplexer allows such temporal field orthogonal modes to be used for encoding data for telecommunications, for example.

The skilled person will appreciate that such temporal field orthogonal modes enable the time-frequency domain to be exploited, which thus opens up more space for the encoding of data, thus enabling such modes to be able to pack more data into the existing telecommunication bands, for example. Indeed the Applicant has appreciated that this may allow for the density of data encoded to be increased compared to intensity quasi-orthogonal modes which are not optimal for packing the time-frequency space.

This is particularly useful because the skilled person will also appreciate that there is a finite amount of frequency space available in telecommunications (e.g. in the IEEE C-band), so it is beneficial to be able to pack as much data into this space in order to optimise the use of the available space. In at least preferred embodiments the de-multiplexer of the present invention is compatible with dense wavelength division multiplexing (DWDM).

The two co-propagating modes of electromagnetic radiation, for separation by the de-multiplexer and using the method of the present invention, and which are input to be incident upon the volume through the input of the de-multiplexer, may be any suitable and desired modes of electromagnetic radiation that have their temporal electric fields orthogonal to each other. Preferably the two modes of electromagnetic radiation comprise (e.g. are encoded into) a single pulse of electromagnetic radiation.

In a preferred embodiment the de-multiplexer comprises a signal source of electromagnetic radiation for generating (and, e.g., multiplexing) the two co-propagating modes of electromagnetic radiation. In a preferred embodiment the signal source of electromagnetic radiation comprises a laser. Preferably the signal source (e.g. laser) is arranged to direct the electromagnetic radiation it generates via the input of the de-multiplexer (e.g. along a waveguide (e.g. an optical fibre)) to be incident upon the volume.

The signal source of electromagnetic radiation may be arranged to generate the two co-propagating modes of electromagnetic radiation to be incident upon the volume in any suitable and desired way. In a preferred embodiment the signal source is arranged to generate pulses of electromagnetic radiation. Thus preferably the two co-propagating modes of electromagnetic radiation incident upon the atomic ensemble are pulsed.

Any suitable and desired basis for providing the two co-propagating, temporal field orthogonal modes of electromagnetic radiation may be used. In a preferred embodiment the two co-propagating, temporal field orthogonal modes of electromagnetic radiation comprise Hermite-Gauss modes, i.e. modes that are described using a set of Hermite-Gauss functions. The skilled person will appreciate that Hermite-Gauss modes are advantageous because they are compact in time-frequency space (owing to the Hermite-Gauss functions being eigenfunctions of the Fourier transform), so this minimal spread in time and space gives efficient packing of the modes.

The signal source of electromagnetic radiation may be arranged to generate the two co-propagating modes of electromagnetic radiation at any suitable and desired frequency or wavelength. Preferably the two co-propagating modes of electromagnetic radiation have a frequency between 187 THz and 200 THz, corresponding to a wavelength of between 1600 nm and 1500 nm. Such frequencies are suitable to use for telecommunications. In one embodiment the two co-propagating modes of electromagnetic radiation have a frequency between 195.9 THz and 191.6 GHz (corresponding to a wavelength from 1565 nm to 1530 nm), i.e. in the IEEE C-band for infrared. In another embodiment the two co-propagating modes of electromagnetic radiation have a frequency between 190.1 THz and 197.2 THz (corresponding to a wavelength from 1577.03 nm to 1520.25 nm), i.e. in the International Telecommunication Union (ITU) DWDM frequency grid (e.g. from one of the 72 channels). Preferably the two co-propagating modes of electromagnetic radiation have the same frequency as each other.

The volume, which has a path through it for receiving (e.g. a mode of) electromagnetic radiation may be provided in any suitable and desired way. In one embodiment the volume comprises a (e.g. optical) cavity. In one embodiment the volume comprises (e.g. contains) an atomic ensemble. Both of these embodiments will be discussed further below.

The volume has a mode that is free from parametric classical non-linear optical interactions. Preferably the mode is a stationary mode of the volume and thus preferably the one of the two co-propagating modes of electromagnetic radiation is accepted onto a stationary mode of the volume.

The input for directing two co-propagating modes of electromagnetic radiation (for separation by the de-multiplexer) to be incident upon the volume, may be any suitable and desired input. In a preferred embodiment the input comprises a waveguide, e.g. an optical fibre. Preferably the input source is coupled to the volume, e.g. via the waveguide.

The time-dependent control field may be provided in any suitable and desired way by the control source. Preferably the control field comprises a pulse of electromagnetic radiation. Preferably the control source is arranged to direct the control field in a direction collinear with the two co-propagating modes of electromagnetic radiation.

In one embodiment the control source is arranged to direct the control field in the same direction as (e.g. co-propagating with) the two co-propagating modes of electromagnetic radiation, e.g. such that the control field and the two co-propagating modes of electromagnetic radiation are both incident upon the volume at the same location. In another embodiment the control source is arranged to direct the control field in the opposite direction as (e.g. counterpropagating with) the two co-propagating modes of electromagnetic radiation, e.g. such that the control field and the two co-propagating modes of electromagnetic radiation are incident upon the volume (e.g. at opposite ends thereof) and then overlap within the volume.

Thus the control field and the two co-propagating modes of electromagnetic radiation may be incident upon and overlap contemporaneously and spatially inside the volume (e.g. along a path through the volume), or may overlap contemporaneously and spatially on an input window or mirror of the volume.

The control field may have (and the control source may be arranged to generate a control field having) any suitable and desired time-dependency such that it is able, e.g. along with the volume, to separate the two modes of electromagnetic radiation spatially and/or temporally. In a preferred embodiment the bandwidth of the (e.g. pulse of the) control field is greater than the bandwidth of the (e.g. pulse of the) two co-propagating modes of electromagnetic radiation. Preferably the duration of time over which the time-dependent control field changes amplitude (e.g. turns on) is less than the duration of the (e.g. pulse of the) two co-propagating modes of electromagnetic radiation.

In one embodiment the bandwidth of the (e.g. pulse of the) control field is less than 50 GHz. Preferably the bandwidth of the (e.g. pulse of the) control field is compatible with the ITU DWDM frequency grid.

The control field may have (and the control source may be arranged to generate a control field having) any suitable and desired frequency. In one embodiment the frequency of the control field is between 1 GHz and 400 THz.

In a preferred embodiment the time-dependent control field comprises (and the control source is arranged to generate) a complex control field (i.e. the control field induces a change on the volume such that its affect can be described by both a real and imaginary coupling parameter). Preferably both the real and imaginary parts of the control field are time-dependent. The modulation of the real part of the control field is preferably arranged to act on (e.g. modulate) the amplitude of one or both of two co-propagating modes of electromagnetic radiation (e.g. of the mode that is reflected or transmitted). The modulation of the imaginary part of the control field is preferably arranged to act on (e.g. modulate) the phase of one or both of two co-propagating modes of electromagnetic radiation (e.g. of the mode that is reflected or transmitted).

The time-dependent control field may be shaped (e.g. modulated by the control source) in any suitable and desired way such that (e.g. along with the volume being arranged) it separates the two co-propagating modes of electromagnetic radiation. Preferably the control source is arranged to modulate (shape) the control field when the two co-propagating modes of electromagnetic radiation are incident upon the volume. Preferably the control field comprises a pulse of electromagnetic radiation.

In one embodiment (e.g. in addition to the time-dependency characteristics outlined above) the control field is arranged to be pre-shaped, e.g. by the control source. The (e.g. pre-)shaping of the control field may depend on the two co-propagating modes of electromagnetic radiation that are to be separated. Thus preferably the shape of the control field is chosen (e.g. the control source is arranged to generate the control field in a (e.g. predetermined) shape) to separate two particular co-propagating modes of electromagnetic radiation (e.g. two modes from a particular basis of (e.g. Hermite-Gauss) modes). The shape of the control field may be chosen from a library of different shapes, e.g. using a look-up table, corresponding to the two different co-propagating modes of electromagnetic radiation that are desired to separate. As will be discussed below, the shape of the control field may depend on the nature of the volume.

The mode of electromagnetic radiation that is accepted by the volume may be retrieved (e.g. for detection and decoding) in any suitable and desired way. In one embodiment the volume may be arranged to output the accepted mode passively. For example, the volume may be arranged to allow the accepted mode to leak out of the volume, e.g. through a leaky mirror. The volume may be configured to allow the accepted mode to leak out of the volume (e.g. in a direction relative to the direction in which the other of the co-propagating modes of electromagnetic radiation was reflected or transmitted) such that that the two co-propagating modes of electromagnetic radiation are separated temporally and/or spatially from each other.

In another embodiment the mode of electromagnetic radiation that is accepted by the volume is actively output from the volume. Preferably the control field is used to output the accepted mode of electromagnetic radiation from the volume. This helps to separate the two co-propagating modes of electromagnetic radiation temporally (and, e.g., spatially) from each other, e.g. the control field may be applied to the volume after a time period such that the accepted mode of electromagnetic radiation is output from the volume after the other mode of electromagnetic radiation has been reflected or transmitted.

Thus, in one embodiment the control source is arranged to modulate the control field after the mode of electromagnetic radiation has been accepted into the volume (e.g. after a time period that is greater than the duration of the (e.g. pulse of the) two co-propagating modes of electromagnetic radiation), such that the accepted mode of electromagnetic radiation is output from the volume, e.g. so that it may be received (detected) and decoded. This (second) modulation of the control field acts on the (e.g. stationary) mode of the volume (onto which the incident mode of electromagnetic radiation has been accepted, to output the accepted mode of electromagnetic radiation from the volume. Thus preferably the method comprises (and the control source is arranged to) shaping and directing the time-dependent control field to be incident upon the volume to output the accepted mode of electromagnetic radiation from the volume.

As with the modulation of the control field when the two co-propagating modes of electromagnetic radiation are first incident upon the volume, preferably the time-dependent control field may be shaped (e.g. modulated by the control source) in any suitable and desired way such that (e.g. along with the volume being arranged) the mode of electromagnetic radiation accepted into the volume is output. Thus preferably the time-dependent control field arranged to be incident upon the volume to output the accepted mode of electromagnetic radiation from the volume comprises a pulse of electromagnetic radiation.

In one embodiment (e.g. in addition to the time-dependency characteristics outlined above) the control field is arranged to be pre-shaped, e.g. by the control source, for outputting the accepted mode of electromagnetic radiation from the volume. The (e.g. pre-)shaping of the control field may depend on the accepted mode of electromagnetic radiation that is to be output from the volume. Thus preferably the shape of the control field is chosen (e.g. the control source is arranged to generate the control field in a (e.g. predetermined) shape) to output the accepted mode of electromagnetic radiation (e.g. a mode from a particular basis of (e.g. Hermite-Gauss) modes). The shape of the control field may be chosen from a library of different shapes, e.g. using a look-up table, corresponding to the mode of electromagnetic radiation that is desired to output from the volume. As will be discussed below, the shape of the control field may depend on the nature of the volume.

The (e.g. modulation of the) control field arranged to output the accepted mode of electromagnetic radiation from the cavity may be generated by the control source that generated the control field for separating the two co-propagating modes of electromagnetic radiation. For example, the control source may arrange for the control field to comprise two pulses of electromagnetic radiation to be incident upon the volume, the first to accept one of the two co-propagating modes of electromagnetic radiation into the volume (and to reflect or transmit the other mode), and the second (at a subsequent time) to output the accepted mode from the volume.

However there may be separate control fields used for the input and output of the accepted mode of electromagnetic radiation. Thus in one embodiment the de-multiplexer comprises an input control source arranged to generate an time-dependent input control field arranged to cause the volume to accept one of the two modes of electromagnetic radiation onto a mode of the volume and a time-dependent output control field arranged to cause the volume to output the accepted mode of electromagnetic radiation from the volume.

In some embodiments, when the control field is used (e.g. modulated) to output the accepted mode from the volume, the control source may be arranged to shape the control field such that accepted mode of electromagnetic radiation is converted into a different mode (e.g. from a particular basis of (e.g. Hermite-Gauss) modes) when it is output from the volume. This may be achieved in any suitable and desired way, e.g. by the control source shaping the control field.

In the embodiment in which the volume comprises a cavity, preferably the cavity is arranged to accept one of the two co-propagating modes of electromagnetic radiation into the cavity and to reflect or transmit the other of the two modes of electromagnetic radiation. Thus preferably the mode accepted into the cavity performs at least one (and preferably multiple) round trip(s) in the cavity. Preferably the cavity time (for the accepted mode to perform a round trip) is (e.g. much) less than (e.g. is short compared to) the length (duration) of the (e.g. input pulse of the) two modes of co-propagating electromagnetic radiation. Preferably the bandwidth of the mode accepted into the cavity is (e.g. much) less than the bandwidth of the cavity.

Preferably the mode accepted into the cavity is filtered (e.g. the mode is selected by the control field) onto a stationary mode of the cavity (whereas the other of the two co-propagating modes is not, thus separating the two modes from each other). Therefore preferably the cavity is arranged (e.g. designed, e.g. dimensioned) to match one of the two co-propagating modes of electromagnetic radiation to the (e.g. stationary) mode of the cavity (that is free from parametric classical non-linear optics), thus selecting the accepted mode from the transmitted or reflected mode.

Preferably the cavity is arranged to operate in a bad cavity regime, e.g. preferably the bandwidth of the mode accepted into the cavity is (e.g. much) less than the bandwidth of the cavity. Preferably the cavity is arranged to operate at a high fidelity, e.g. such that there is low cross-talk between orthogonal temporal modes. The high fidelity of the cavity helps to separate the two co-propagating modes as efficiently as possible and helps to minimise losses from the cavity.

In a preferred embodiment the cavity comprises an electro-optic modulator arranged to be controlled by the control field, e.g. preferably the control field and the two co-propagating modes of electromagnetic radiation are arranged to be incident upon the electro-optic modulator. Preferably the electro-optic modulator is arranged to modulate the (e.g. amplitudes and/or phases of the) two co-propagating modes (when the two co-propagating modes of electromagnetic radiation are incident upon the cavity (and thus passing through the electro-optic modulators)) such that one of the two modes of electromagnetic radiation is accepted into the cavity and the other of the two modes of electromagnetic radiation is reflected from or transmitted through the cavity. Preferably the control field comprises a radio-frequency (RF) field.

In a preferred embodiment the electro-optic modulator comprises a phase shifter arranged to shift the phase of electromagnetic radiation passing therethrough. It will be appreciated that the application of the control field to the electro-optic modulator modulates the phase response of the (e.g. material of the) electro-optic modulator, thus modulating the phase of electromagnetic radiation passing therethrough (e.g. of the two co-propagating modes). Preferably the bandwidth of the electro-optic modulator is greater than the bandwidth of the (e.g. pulse of the) two co-propagating modes of electromagnetic radiation.

Preferably the electro-optic modulator is positioned at an input (e.g. window or mirror) of the cavity, e.g. coupled to the input of the de-multiplexer (through which the two co-propagating modes of the electromagnetic radiation are input to be incident upon the cavity). In one embodiment an input window or mirror of the cavity comprises the (e.g. only a single) electro-optic modulator. In another embodiment the cavity comprises two electro-optic modulators arranged in an (e.g. Mach-Zehnder) interferometer (and thus preferably the cavity comprises an input coupler (which is a second, internal interferometer) comprising two electro-optic modulators).

One or more, or all, of the optional and preferred features outlined above for a (e.g. single) electro-optical modulator are also applicable for each of the two electro-optical modulators. Thus preferably each of the electro-optic modulators are arranged to be controlled by the control field, e.g. preferably the control field and the two co-propagating modes of electromagnetic radiation are arranged to be incident upon the electro-optic modulators. Preferably the bandwidth of each of the electro-optic modulators is greater than the bandwidth of the (e.g. pulse of the) two co-propagating modes of electromagnetic radiation.

The two electro-optic modulators could be controlled by a single control field. However, preferably each electro-optic modulator is controlled by a separate control field. Thus, in a preferred embodiment the control source of electromagnetic radiation (or two control sources of electromagnetic radiation) is arranged to generate two time-dependent control fields, wherein the two time-dependent control fields are arranged to be incident upon the two electro-optic modulators respectively and to overlap contemporaneously and spatially with the two co-propagating modes of electromagnetic radiation, e.g. each time-dependent control field is arranged to overlap contemporaneously and spatially with the mode of electromagnetic radiation that is incident upon the electro-optic modulator that the control field is controlling.

Preferably the (or each) control source is arranged to generate the two time-dependent control fields such that together the two time-dependent control fields generate an input coupling that causes the cavity to accept one of the two modes of electromagnetic radiation and to reflect or transmit the other of the two modes of electromagnetic radiation, so to spatially and/or temporally separate the two modes of electromagnetic radiation from each other. This may be achieved in any suitable and desired way, e.g. by shaping the control field(s).

In a preferred embodiment the two control fields are arranged to control the phase shift introduced by each of the two electro-optic modulators to the two co-propagating modes of electromagnetic radiation, e.g. by the (or each) control source shaping the two control fields to control the phase shift. Preferably the sum of the phase shifts (e.g. the imaginary part of the input coupling) is arranged to modulate the imaginary part of the two co-propagating modes of electromagnetic radiation and the difference between the phase shifts (e.g. the real part of the input coupling) is arranged to modulate the real part of the two co-propagating modes of electromagnetic radiation. This helps to reflect or transmit one of the two co-propagating modes from the cavity and to accept the other of the modes as the phase shifts of the electro-optic modulators may be tuned in this way to separate the two co-propagating modes.

In a preferred embodiment the mode selectivity of the control field is performed by modulating a time-dependent coupling γ(t) to a single harmonic oscillator mode, e.g. the mode to be accepted into the cavity. When this mode is an optical mode confined in a cavity, γ(t)=[1−αR(t)]/τ is the instantaneous linewidth of the cavity mode, with α the cavity roundtrip amplitude transmission, τ the cavity roundtrip time, and R(t) the time-dependent amplitude reflectivity of the input/output coupler (e.g. the electro-optic modulator(s)).

For a low-loss cavity with 1−α<<γτ, the mode E(t) selected by the cavity is given by $$E(t) \propto \gamma(t) \exp[\int_{-\infty}^{t} \gamma(t') dt']$$

which can be inverted to find the required temporal profile of the reflectivity modulation $$R(t) = 1 - \frac{|E(t)|^2 \tau}{2 \int_{-\infty}^{t} |E(t')|^2 dt'}.$$

The control field may be shaped in a similar way when outputting the stored mode of electromagnetic radiation.

Preferably the interferometer comprises one or more (e.g. two) beam-splitters and preferably the two electro-optic modulators are arranged (e.g. relative to the beam-splitter(s)) in different optical paths of the interferometer. Thus it will be appreciated that in such an arrangement the incident two co-propagating modes of electromagnetic radiation will be split between the two different optical paths of the interferometer and so portions of each mode of the two co-propagating modes of electromagnetic radiation will pass through each of the electro-optic modulators (such that they can be acted upon by the respective electro-optic modulators to separate the two modes from each other).

The time-dependency of the control field(s) may be used (e.g. the control source may be arranged to modulate the control field(s)) in any suitable and desired way to separate the two co-propagating modes of electromagnetic radiation. Preferably the control source is arranged to modulate the control field(s) (e.g. to modulate the phase shift(s) of the electro-optic modulator(s)) when the two co-propagating modes of electromagnetic radiation are incident upon the cavity (and thus passing through the electro-optic modulator(s)). This phase modulation of the electro-optic modulator(s) is arranged to accept one of the two co-propagating modes of electromagnetic radiation into the cavity and to reflect or transmit the other of the two co-propagating modes of electromagnetic radiation from or through the cavity. This may be done in any suitable and desired way, e.g. by shaping the control field(s) such that they are particular to the two modes to be separated.

In these embodiments the two co-propagating modes of electromagnetic radiation are separated by accepting one of the modes into the cavity and reflecting or transmitting the other mode. Preferably the cavity and/or the control field(s) are arranged to transmit the accepted mode after it has been accepted into the cavity, preferably after the accepted mode has performed one or more round trips through the cavity, e.g. such that a time delay for transmission of the accepted mode (compared to the reflecting or transmitting of the reflected or transmitted mode of electromagnetic radiation) is introduced.

In one embodiment the control source is arranged to modulate the control field(s) (e.g. to modulate the phase shift(s) of the electro-optic modulator(s)) (e.g. again) after the mode of electromagnetic radiation has been accepted into the cavity (e.g. after a time period that is greater than the duration of the (e.g. pulse of the) two co-propagating modes of electromagnetic radiation), such that the accepted mode of electromagnetic radiation is output from the cavity, e.g. so that it may be received (detected) and decoded.

In the embodiment described above in which the control field is actively used to output the mode of electromagnetic radiation that has been accepted into the cavity, the cavity comprises mirrors at each end of the cavity, wherein the reflectivity of the mirrors is substantially 100%. This helps to allow the accepted mode of electromagnetic radiation to be retained inside the cavity until the control field is applied to the cavity to output the accepted mode.

The cavity (and, e.g., the control source) may be arranged to output the accepted mode of electromagnetic radiation from the cavity in any suitable and desired direction, e.g. depending on the direction in which, or to which part of the cavity, the control field is applied by the control source (e.g. either in the direction of, or to, the input mirror (the mirror onto which the two co-propagating modes of electromagnetic radiation are first incident), or in the direction of, or to, the output mirror (the mirror at the opposite end of the cavity from the input mirror)). Thus the control source may be arranged to apply the control field (for outputting the accepted mode) to, or in the direction of, the input or output mirror of the cavity, or the de-multiplexer may comprise a further control source arranged to apply the control field (for outputting the accepted mode) to, or in the direction of, the input or output mirror of the cavity.

Alternatively or additionally, the electro-optical modulator(s) and/or the interferometer may be arranged (e.g. the position(s) and/or configuration thereof) to control the direction in which the accepted mode of electromagnetic radiation is output from the cavity.

The control source may be arranged to modulate the control field such that the one of the two co-propagating modes of electromagnetic radiation is output in the same mode as it was input and accepted into the cavity. However, in one embodiment the control source is arranged to modulate the control field such that the accepted mode of electromagnetic radiation is output in a different mode from the mode that was input and accepted into the cavity. Thus the accepted mode may be able to be converted into a different mode on its output from the cavity. Preferably this is achieved by shaping (modulating) the control field such that the mode is converted when the accepted mode is to be output.

In another embodiment the cavity is arranged to allow the accepted mode of electromagnetic radiation to leak out of the cavity (e.g. passively), e.g. after performing one or more round trips of the cavity, thus temporally separating the two co-propagating modes of electromagnetic radiation from each other. Preferably the cavity comprises a mirror at one or both ends of the cavity, wherein the (e.g. reflectivity of the) mirror is arranged to allow the accepted mode of electromagnetic radiation to leak out of the cavity. Thus the cavity may be arranged to allow the accepted mode of electromagnetic radiation to leak out of either end of the cavity, e.g. through the input or output mirror. Thus it will be appreciated that this may allow the two co-propagating modes of electromagnetic radiation to be separated temporally and/or spatially.

In one embodiment the cavity comprises a gain medium. This helps to maintain the intensity of the two co-propagating modes of electromagnetic radiation, particularly the mode that is accepted into the cavity. It may also be helpful when the cavity comprises one or more electro-optic modulators, owing to such modulators sometimes being a bit lossy.

In the embodiment in which the volume comprises an atomic ensemble, preferably the atomic ensemble is arranged to accept one of the two co-propagating modes of electromagnetic radiation into the atomic ensemble and to transmit the other of the two modes of electromagnetic radiation through the atomic ensemble. Preferably the atomic ensemble comprises atomic valence electrons having a first state, a second state and a third state, wherein the second state has a higher energy than, and is linked to, the first state by an atomic transition, and the third state has a higher energy than, and is linked to, the second state by an atomic transition.

Preferably the atomic ensemble is arranged to accept one of the two co-propagating modes of electromagnetic radiation into the atomic ensemble by (the input) directing the two co-propagating modes of electromagnetic radiation to be incident upon the atomic ensemble. Preferably one of the two co-propagating modes is arranged to stimulate (e.g. off-resonant) transitions of the atomic valence electrons in the atomic ensemble between the first state and the second state or between the second state and the third state. Preferably the control field is arranged to be incident upon the atomic ensemble to stimulate (e.g. off-resonant) transitions of the atomic valence electrons in the atomic ensemble between the second state and the third state or between the first state and the second state (i.e. the other of the two transitions from the transition that the one of the two co-propagating modes of electromagnetic radiation is stimulating).

Preferably the atomic ensemble is arranged such that on incidence of the one of the two co-propagating modes of electromagnetic radiation and the control field to the atomic ensemble, a coherent excitation of the transition between the first state and the third state is created such that the control field selects one of the two co-propagating modes of electromagnetic radiation, thus accepting (e.g. storing) this mode in the atomic ensemble.

Thus, in this embodiment, the atomic ensemble acts as a quantum memory storage medium for the one of the two co-propagating modes of electromagnetic radiation to be accepted into the atomic ensemble (e.g. the mode is "written" to the quantum memory), with the atomic ensemble having a "ladder" configuration of atomic states for the atomic valence electrons.

Preferably the atomic ensemble is arranged such that the other of the two co-propagating modes of electromagnetic radiation preferably does not form (with the control field) a coherent excitation of the atomic valence electrons in the atomic ensemble, such that the other of the two modes is transmitted through the atomic ensemble, thus separating this transmitted mode from the mode accepted into the atomic ensemble.

Preferably the one of the two co-propagating modes of electromagnetic radiation and the control field are arranged such that the inverse of the residual Doppler linewidth owing to the incidence of the one of the two co-propagating modes of electromagnetic radiation and the control field on the atomic valence electrons in the atomic ensemble is greater than half the lifetime of the coherent excitation of the transition between the first state and the third state (i.e. $1/\Delta W_D > \tau_{13}/2$, where $\Delta W_D$ is the residual Doppler linewidth and $\tau_{13}$ is the lifetime of the coherent excitation). This helps to reduce the Doppler shifts and thus to maintain the coherent excitation in the atomic ensemble. The effect of Doppler dephasing may be reduced by applying a rephasing or state preparation technique to the atomic ensemble.

The residual Doppler linewidth, $\Delta W_D$, is the (scalar) product of the residual wave vector of the electromagnetic radiation of the one of the two co-propagating modes and the control field, and the thermal velocity of the atoms in the atomic ensemble (i.e. $\Delta W_D = \Delta k \cdot v$, where $\Delta k$ is the residual wave vector of the electromagnetic radiation of the one of the two co-propagating modes and the control field (i.e. the vector sum of the wave vectors of the electromagnetic radiation from each of the one of the two co-propagating modes and the control field) and v is the thermal velocity of the atoms in the atomic ensemble).

The control field and the one of the two co-propagating modes (the mode to be accepted) may be arranged to stimulate the lower (between the first and second states) and upper (between the second and third states) transitions respectively of the ladder of transitions of the atomic valence electrons in the atomic ensemble (or vice versa) as is suitable and desired. Preferably the ladder of transitions is chosen so that the mode to be accepted has its frequency matched to one of the two transitions of the atomic valence electrons in the atomic ensemble and the control field has its frequency matched to the other of the two transitions, so that the coherent excitation may be set up. Preferably one of the two transitions of atomic valence electrons in the atomic ensemble (e.g. the transition matched to the one of the two co-propagating modes of electromagnetic radiation) has a frequency for use in telecommunications, e.g. a frequency in a telecommunications band. Thus, as will be seen below, an atomic ensemble may be chosen so that it provides suitable ladder of transitions of the atomic valence electrons in the atomic ensemble.

Preferably the one of the two co-propagating modes of electromagnetic radiation to be accepted by the atomic ensemble has a frequency corresponding to an off-resonant atomic transition between the first state and the second state or between the second state and the third state of atomic valence electrons in the atomic ensemble. Preferably the control field has a frequency corresponding to an off-resonant atomic transition between the second state and the third state or between the first state and the second state of atomic valence electrons in the atomic ensemble. Using off-resonant transitions between the first and second states, and the second and third states (owing to the choice of the frequencies of the one of the two co-propagating modes of electromagnetic radiation and the control field), may help to reduce the noise of the de-multiplexer by helping to remove fluorescence noise.

Preferably the control source is arranged to generate the time-dependent control field such that the time-dependent control field generates an input coupling that causes the atomic ensemble to accept one of the two co-propagating modes of electromagnetic radiation and to transmit the other of the two modes of electromagnetic radiation, so to spatially and/or temporally separate the two modes of electromagnetic radiation from each other. This may be achieved in any suitable and desired way.

The time-dependency of the control field may be used (e.g. the control source may be arranged to modulate the control field) in any suitable and desired way to separate the two co-propagating modes of electromagnetic radiation. Preferably the control source is arranged to modulate the control field when the two co-propagating modes of electromagnetic radiation are incident upon the atomic ensemble (and thus overlapping with the control field in the atomic ensemble). This modulation of control field is arranged to accept one of the two co-propagating modes of electromagnetic radiation into the atomic ensemble (i.e. by forming a coherent excitation with the control field) and to transmit the other of the two co-propagating modes of electromagnetic radiation through the atomic ensemble.

This may be done in any suitable and desired way, e.g. by shaping the control field appropriately such that it is particular to the two modes to be separated. In a preferred embodiment the control field comprises (and the control source is arranged to generate) a pulse of electromagnetic radiation to be incident upon the atomic ensemble.

In a preferred embodiment the coupling of the control field to the mode to be accepted into the atomic ensemble is given by $\gamma(t) \propto |\Omega(t)|^2$, where $\Omega(t)$ is the time-dependent Rabi frequency describing the shape of the control field mediating the atomic absorption. In one embodiment, the atomic resonance experiences a Stark shift $\delta(t) \propto |\Omega(t)|^2$ that should be compensated. Thus preferably the control field is given by $$\Omega(t) \propto \frac{E(t)}{\sqrt{\int_{-\infty}^{t} |E(t')|^2 dt'}} \times \exp\left[-i \int_{-\infty}^{t} \delta(t') dt'\right].$$

The control field may be shaped in a similar way when outputting the stored mode of electromagnetic radiation.

In embodiments the two co-propagating modes of electromagnetic radiation are separated by accepting one of the modes into the atomic ensemble and transmitting the other mode. Preferably the atomic ensemble and/or the control field(s) are arranged to transmit (output) the accepted mode after it has been accepted into the atomic ensemble, e.g. such that a time delay for transmission of the accepted mode (compared to the transmission of the transmitted mode of electromagnetic radiation) is introduced.

Preferably the control source is arranged to modulate (i.e. shape) the control field (e.g. again) after the mode of electromagnetic radiation has been accepted into the atomic ensemble (e.g. after a time period that is greater than the duration of the (e.g. pulse of the) two co-propagating modes of electromagnetic radiation in the volume and/or preferably after a time period that is less than the lifetime of the coherence between the first and third states of the atomic valence electrons in the atomic ensemble), such that the accepted mode of electromagnetic radiation is output from the atomic ensemble, e.g. so that it may be received (detected) and decoded.

The control field arranged to output the accepted mode from the atomic ensemble could be a different control field (and thus could be generated by a different control source) from the control field (and control source) used for accepting the mode into the atomic ensemble. However, preferably the control source used for generating the control field for accepting the mode into the atomic ensemble is also arranged to generate a (e.g. the same) control field for outputting the accepted mode from the atomic ensemble.

This subsequent modulation of the control field (e.g. an incidence of a subsequent pulse of electromagnetic radiation from the control source on the atomic ensemble) stimulates emission of the accepted (stored) mode of electromagnetic radiation from the atomic ensemble, thus transmitting (i.e. retrieving) the accepted mode of electromagnetic radiation from the atomic ensemble (i.e. the mode is "read" from the quantum memory) and temporally separating this mode from the previously transmitted one of the two co-propagating modes of electromagnetic radiation.

Preferably the control field comprises a pulse of electromagnetic radiation. Thus, in a preferred embodiment, a pulse of the control field is arranged to be incident upon the atomic ensemble to store the accepted mode in the atomic ensemble and another (subsequent) pulse of the control field is arranged to be incident upon the atomic ensemble to output the accepted mode from the atomic ensemble.

The atomic ensemble may comprise any suitable and desired atoms. In a preferred embodiment the atomic ensemble comprises alkali metal atoms (group 1 elements) or alkali earth metal atoms (group 2 elements), e.g. strontium. Preferably the atomic ensemble comprises rubidium atoms, caesium atoms or sodium atoms.

The atomic ensemble may be prepared in any suitable and desired state. In one embodiment the atomic ensemble is a solid, e.g. a crystal, e.g. a rare earth doped crystal. However preferably the atomic ensemble is a gas, e.g. a vapour.

The atomic ensemble may be provided in the de-multiplexer in any suitable and desired way. In a preferred embodiment the de-multiplexer comprises a vapour cell within which the atomic ensemble is held.

The first, second and third states of the atomic valence electrons in the atomic ensemble and the atomic transitions therebetween may be any suitable and desired atomic states and atomic transitions. In a preferred embodiment the first state is one of the ground states of the atomic valence electrons in the atomic ensemble. The second state is higher than the first state and the third state is higher than the second state. The first state is (e.g. directly) linked to the second state via an (e.g. single) atomic transition. The second state is (e.g. directly) linked to the third state via an (e.g. single) atomic transition.

Preferably the first, second and third states have different orbital angular momentum quantum numbers. Preferably the difference in orbital angular momentum quantum number between the first state and the second state is 1. Preferably the difference in orbital angular momentum quantum number between the second state and the third state is 1. Thus, in a particularly preferred embodiment the first state has an orbital angular momentum quantum number of 0 (i.e. an S state). Preferably the second state has an orbital angular momentum quantum number of 1 (i.e. a P state). Preferably the third state has an orbital angular momentum quantum number of 2 (i.e. a D state).

The input and the control source may be arranged to direct the two co-propagating modes of electromagnetic radiation and the control field respectively into the atomic ensemble, such that they overlap spatially and temporally in the atomic ensemble, in any suitable and desired way. In one embodiment the input and the control source are arranged to direct the two co-propagating modes of electromagnetic radiation and the control field respectively into the atomic ensemble in substantially the same (e.g. collinear) direction as each other. However, in a preferred embodiment, the input and the control source are arranged to direct the two co-propagating modes of electromagnetic radiation and the control field respectively into the atomic ensemble in substantially opposite (and, e.g., collinear) directions.

As well as making it easier for the two co-propagating modes of electromagnetic radiation and the control field to overlap within the atomic ensemble, directing these fields into the atomic ensemble in opposite directions also helps to cancel out any Doppler shifts induced by these fields on the atomic ensemble. This helps reduce Doppler dephasing (the detrimental effect of the thermal motion of the atoms on the lifetime) of the coherent excitation between the first and third states.

Preferably the inverse of the residual Doppler linewidth owing to the incidence of the one of the two co-propagating modes of electromagnetic radiation and the control field on the atomic valence electrons in the atomic ensemble is greater (e.g. two times greater) than the lifetime of the coherent excitation of the transition between the first state and the third state required to implement the de-multiplexing operation.

It will be appreciated that the states and the transitions of the atomic ensemble for use in the de-multiplexer of the present invention preferably depend on the composition of (i.e. the type of atoms in) the atomic ensemble such that the one of the two co-propagating modes of electromagnetic radiation and the control field are able to stimulate the (e.g. off-resonant) transitions between the first and second states, and between the second and third states (or vice versa).

In a particularly preferred embodiment the atomic ensemble comprises rubidium atoms; the first state is the 5S state of rubidium, the second state is the 5P state of rubidium and the third state is the 4D state of rubidium. Thus preferably the one of the two co-propagating modes of electromagnetic radiation (to be accepted by the atomic ensemble) or the control field is arranged to stimulate the 5S to 5P transition of rubidium and the control field or the one of the two co-propagating modes of electromagnetic radiation is arranged to stimulate the 5P to 4D transition of rubidium.

It will be appreciated that the 5P to 4D transition of rubidium (at 1528 nm) is at a frequency suitable for use in telecommunications (and thus preferably the one of the two co-propagating modes of electromagnetic radiation is arranged to stimulate the 5P to 4D transition of rubidium and the control field is arranged to stimulate the 5S to 5P transition of rubidium). Furthermore, it will be appreciated that the 5P to 4D transition of rubidium has a time-dependent coupling, such that application of a time-dependent control field to the 5S to 5P transition of rubidium helps to enable the atomic ensemble to be mode selective between the two co-propagating modes of electromagnetic radiation that are incident upon the atomic ensemble.

In a preferred embodiment the de-multiplexer comprises a cavity and the atomic ensemble is arranged inside the cavity. This may help to increase the coupling of the control field and the one of the two co-propagating modes of electromagnetic radiation to the respective transitions of the atomic valence electrons of the atomic ensemble (e.g. owing to the increased fidelity of the cavity) and/or may help the atomic ensemble to be single mode (e.g. for the one of the two co-propagating modes of electromagnetic radiation to be accepted). This therefore helps to select one of the two co-propagating modes of electromagnetic radiation and separate from the other of the two modes.

Although, at least in preferred embodiments, the lifetime of the coherent excitation between the first and third states may be relatively short, it will be appreciated that this may be long enough to accept (store) and output (retrieve) the one of the two co-propagating modes of electromagnetic radiation in the atomic ensemble, e.g. depending on the rate at which the device is clocked. It will also be appreciated that when the atomic ensemble comprises rubidium atoms and the third state is the 4D state, the lifetime of this state (which is a limiting factor in the lifetime of the coherent excitation) is approximately 80 ns which may be of sufficient length to accept and output the one of the two co-propagating modes electromagnetic radiation in the atomic ensemble.

The one of the two co-propagating modes of electromagnetic radiation may have any suitable and desired frequency that corresponds to an (e.g. off-resonant) atomic transition between the first state and the second state or (e.g. preferably) between the second state and the third state of the atomic valence electrons in the atomic ensemble. In a preferred embodiment the frequency of the electromagnetic radiation generated by the signal source is approximately 196 THz or 1528 nm (i.e. corresponding to the 5P to 4D transition in rubidium).

As indicated, preferably the frequency of the one of the two co-propagating modes of electromagnetic radiation is detuned (off-resonant) from the transition of the atomic valence electrons in the atomic ensemble that it stimulates. In a preferred embodiment the frequency of the one of the two co-propagating modes of electromagnetic radiation is detuned (off-resonant) from the frequency of the transition between the first state and the second state or (e.g. preferably) between the second state and the third state of the atomic valence electrons in the atomic ensemble by between 5 GHz and 100 GHz, e.g. approximately 50 GHz. Preferably the detuning of the one of the two co-propagating modes of electromagnetic radiation from the frequency of the transition that it stimulates is approximately ten times greater than the bandwidth of the one of the two co-propagating modes of electromagnetic radiation. Also preferably, the detuning of the one of the two co-propagating modes of electromagnetic radiation from the frequency of the transition that it stimulates is greater than the Doppler linewidth (e.g. after any Doppler cancellation) and, e.g., the hyperfine splitting.

The control source of electromagnetic radiation, that is arranged to generate a control field of electromagnetic radiation having a frequency corresponding to, and arranged to stimulate, an (e.g. off-resonant) atomic transition between the second state and the third state or between the first state and the second state of atomic valence electrons in the atomic ensemble, may be provided in any suitable and desired way. In a preferred embodiment the control source of electromagnetic radiation comprises a laser. Thus preferably the laser is arranged to direct the electromagnetic radiation it generates, e.g. along a waveguide (e.g. an optical fibre), to be incident upon the atomic ensemble.

The control source of electromagnetic radiation may have any suitable and desired frequency that corresponds to an (e.g. off-resonant) atomic transition between the second state and the third state or between the first state and the second state of atomic valence electrons in the atomic ensemble. In a preferred embodiment the frequency of the control field generated by the control source is approximately 384 THz or 780 nm (i.e. corresponding to the 5S to 5P transition in rubidium).

As indicated, preferably the frequency of the control field is detuned (off-resonant) from the transition it stimulates (e.g. between the second state and the third state or between the first state and the second state) of the atomic valence electrons in the atomic ensemble. In a preferred embodiment the frequency of the control field is detuned (off-resonant) from the frequency of the transition of the atomic valence electrons that it stimulates in the atomic ensemble by between 5 GHz and 100 GHz, e.g. approximately 50 GHz. Preferably the detuning of the control field from the frequency of the transition it stimulates is approximately ten times the bandwidth of the control field.

The control source may be arranged to generate the control field to be incident upon the atomic ensemble in any suitable and desired way. As discussed above, in a preferred embodiment the control source is arranged to generate pulses of electromagnetic radiation. Thus preferably the control field incident upon the atomic ensemble is pulsed. As discussed above, preferably the (e.g. pulse(s) of the) control field is shaped by the control source to couple with the one of the two co-propagating modes of electromagnetic radiation incident upon the atomic ensemble to generate the coherent excitation of the atomic ensemble.

Preferably the bandwidth of the pulses of the control field from the control source is between 1 MHz and 1.7 THz, e.g. between 100 MHz and 1 THz, e.g. between 1 GHz and 1 THz, e.g. between 10 GHz and 500 GHz, e.g. approximately 100 GHz. Preferably the pulses of electromagnetic radiation of the control field from the control source have a duration between 10 ps and 500 ps, e.g. between 20 ps and 400 ps, e.g. approximately 50 ps.

Preferably the bandwidth of the pulses of the control field from the control source is greater than or approximately equal to the bandwidth of the pulses of the two co-propagating modes of electromagnetic radiation (to be accepted by the atomic ensemble), as this may help to allow the control field to overlap with the two co-propagating modes of electromagnetic radiation and thus accept the one of the two co-propagating modes in the atomic ensemble.

The (e.g. atomic ensemble of the) de-multiplexer is configured such that when the one of the two co-propagating modes of electromagnetic radiation and the control field are incident upon the atomic ensemble, this creates a coherent excitation of the two-photon transition between the first state and the third state. Preferably the coherent excitation is resonant with this transition. Thus, although the frequencies of the one of the two co-propagating modes of electromagnetic radiation and the control field are preferably (e.g. each) detuned (off-resonance) from the respective transitions between the first, second and third states they stimulate, preferably together they are resonant with the combined transition between the first and third states (via the off-resonant second state). Thus in a preferred embodiment the sum of the frequencies of the one of the two co-propagating modes of electromagnetic radiation and the control field is substantially equal (e.g. having a detuning of less than 500 MHz) to the sum of the frequency of the transition between the first and second states and the frequency of the transition between the second and third states of the atomic valence electrons in the atomic ensemble.

The input and the control source may be arranged relative to each other (and to the atomic ensemble), and arranged to direct their respective electromagnetic radiation that they generate, in any suitable and desired configuration. Preferably the two co-propagating modes of electromagnetic radiation and the control field are arranged to be incident upon the atomic ensemble in substantially opposite directions. Preferably the two co-propagating modes of electromagnetic radiation and the control field are arranged to be substantially collinear (albeit in different directions).

The control source may be arranged to modulate the control field such that the one of the two co-propagating modes of electromagnetic radiation is output in the same mode as it was input and accepted into the atomic ensemble. However, in one embodiment the control source is arranged to modulate the control field such that the accepted mode of electromagnetic radiation is output in a different mode from the mode that was input and accepted into the atomic ensemble. Thus the accepted mode may be able to be converted into a different mode on its output from the atomic ensemble. Preferably this is achieved by shaping (modulating) the control field such that the mode is converted when the accepted mode is to be output.

Furthermore, the frequency of the accepted mode may also be modulated, e.g. by modulating the frequency of the control field, e.g. by detuning the control field from the transition that it stimulates, but still retaining the coherent transition with the accepted mode in the atomic ensemble.

Operating the apparatus as a mode converter is considered to be novel and inventive in its own right and thus when viewed from a further aspect the invention provides a mode converter for converting a mode of electromagnetic radiation from a first mode to a second mode, the mode converter comprising:

an atomic ensemble comprising atomic valence electrons having a first state, a second state and a third state, wherein the second state has a higher energy than, and is linked to, the first state by one or more atomic transitions, and the third state has a higher energy than, and is linked to, the second state by an atomic transition;

a signal source of electromagnetic radiation arranged to generate a first mode of electromagnetic radiation having a frequency corresponding to an off-resonant atomic transition between the second state and the third state of atomic valence electrons in the atomic ensemble, wherein the first mode of electromagnetic radiation from the signal source is arranged to be incident upon the atomic ensemble to stimulate off-resonant transitions of the atomic valence electrons in the atomic ensemble between the second state and the third state, and preferably wherein the signal source electromagnetic radiation has a bandwidth of greater than 1 GHz;

one or more control sources of electromagnetic radiation each arranged to generate electromagnetic radiation having a frequency corresponding to an off-resonant atomic transition from the one or more atomic transitions linking the first state and the second state of atomic valence electrons in the atomic ensemble, wherein the electromagnetic radiation from the one or more control sources is arranged to be incident upon the atomic ensemble to stimulate off-resonant transitions of the atomic valence electrons in the atomic ensemble between the first state and the second state, and preferably wherein the electromagnetic radiation from each of the one or more control sources has a bandwidth of greater than 1 GHz; and wherein the mode converter is arranged such that on incidence of the first mode of electromagnetic radiation from the signal source and electromagnetic radiation from each of the one or more control sources to the atomic ensemble, a coherent excitation of the transition between the first state and the third state is created that stores the first mode of electromagnetic radiation from the signal source in the atomic ensemble;

wherein the one or more control sources are each arranged to shape the electromagnetic radiation from each of the one or more control sources such that the subsequent incidence of electromagnetic radiation from each of the one or more control sources upon the atomic ensemble stimulates emission of a second mode of electromagnetic radiation from the atomic ensemble such that the first mode of electromagnetic radiation is converted in the second mode of electromagnetic radiation; and wherein the second mode of electromagnetic radiation has substantially the same frequency as the first mode of electromagnetic radiation and the second mode of electromagnetic radiation is a different functional mode than the first mode of electromagnetic radiation.

The invention also provides a method of converting a mode of electromagnetic radiation using a mode converter, the mode converter comprising:

an atomic ensemble comprising atomic valence electrons having a first state, a second state and a third state, wherein the second state has a higher energy than, and is linked to, the first state by one or more atomic transitions, and the third state has a higher energy than, and is linked to, the second state by an atomic transition;

the method comprising:

storing a first mode of electromagnetic radiation in the atomic ensemble by:

stimulating off-resonant transitions of the atomic valence electrons in the atomic ensemble between the second state and the third state by arranging for a first mode of electromagnetic radiation generated by a signal source of electromagnetic radiation to be incident upon the atomic ensemble, wherein the frequency of the electromagnetic radiation from the signal source corresponds to an off-resonant atomic transition between the second state and the third state of atomic valence electrons in the atomic ensemble, and preferably wherein the signal source electromagnetic radiation has a bandwidth of greater than 1 GHz; and stimulating off-resonant transitions of the atomic valence electrons in the atomic ensemble between the first state and the second state by arranging for electromagnetic radiation generated by one or more control sources of electromagnetic radiation to each be incident upon the atomic ensemble, wherein the frequency of the electromagnetic radiation from the one or more control sources each corresponds to an off-resonant atomic transition from the one or more atomic transitions linking the first state and the second state of atomic valence electrons in the atomic ensemble, and preferably wherein the electromagnetic radiation from each of the one or more control sources has a bandwidth of greater than 1 GHz;

wherein the first mode of electromagnetic radiation from the signal source and the electromagnetic radiation from each of the one or more control sources are arranged to be incident upon the atomic ensemble such that a coherent excitation of the transition between the first state and the third state is created that stores the first mode of electromagnetic radiation from the signal source in the atomic ensemble; and converting the first mode of electromagnetic radiation that has been stored in the atomic ensemble into a second mode of electromagnetic radiation by:

further stimulating off-resonant transitions of the atomic valence electrons in the atomic ensemble between the first state and the second state by arranging for electromagnetic radiation generated by one or more control sources of electromagnetic radiation to each be incident upon the atomic ensemble after the first mode of electromagnetic radiation generated by the signal source has been stored in the atomic ensemble;

wherein the electromagnetic radiation from each of the one or more control sources is arranged to be incident upon the atomic ensemble to stimulate emission of a second mode of electromagnetic radiation from the atomic ensemble;

wherein the electromagnetic radiation from each of the one or more control sources is shaped to convert the first mode of electromagnetic radiation into the second mode of electromagnetic radiation; and wherein the second mode of electromagnetic radiation has substantially the same frequency as the first mode of electromagnetic radiation and the second mode of electromagnetic radiation is a different functional mode than the first mode of electromagnetic radiation.

As will be appreciated by those skilled in the art, these aspects of the present invention can, and preferably do, include any one or more or all of the preferred and optional features of the present invention discussed herein, as appropriate.

Preferably the inverse of the residual Doppler linewidth owing to the incidence of the electromagnetic radiation generated by the signal source and the one or more control sources on the atomic valence electrons in the atomic ensemble is greater than half the lifetime of the coherent excitation of the transition between the first state and the third state. Preferably the first and second modes of electromagnetic radiation are (e.g. Hermite-Gauss) temporal field orthogonal modes.

The mode converter may be used by itself; however, in a preferred embodiment the mode converter is positioned downstream of the de-multiplexer and arranged to receive one of the separated output modes of electromagnetic radiation from the de-multiplexer as an input to the mode converter, e.g. the de-multiplexer functions as the signal source of the mode converter, so that this mode may be converted, e.g. into the same mode as the other of the separated output modes of electromagnetic radiation from the de-multiplexer.

Certain preferred embodiments of the invention will now be described, by way of example only, with reference to the accompanying drawings in which:

FIG. 10 shows schematically a de-multiplexer used in combination with a mode converter according to another embodiment of the present invention.

In order to receive, detect and then decode telecommunication signals that have been encoded as multiple co-propagating modes, a de-multiplexer is required to separate the modes from each other, such that the modes are then able to be detected. A de-multiplexer according to an embodiment of the present invention will now be described that is able to separate two co-propagating modes of electromagnetic radiation where the electric fields of the two modes are temporally orthogonal to each other.

Figure 1:
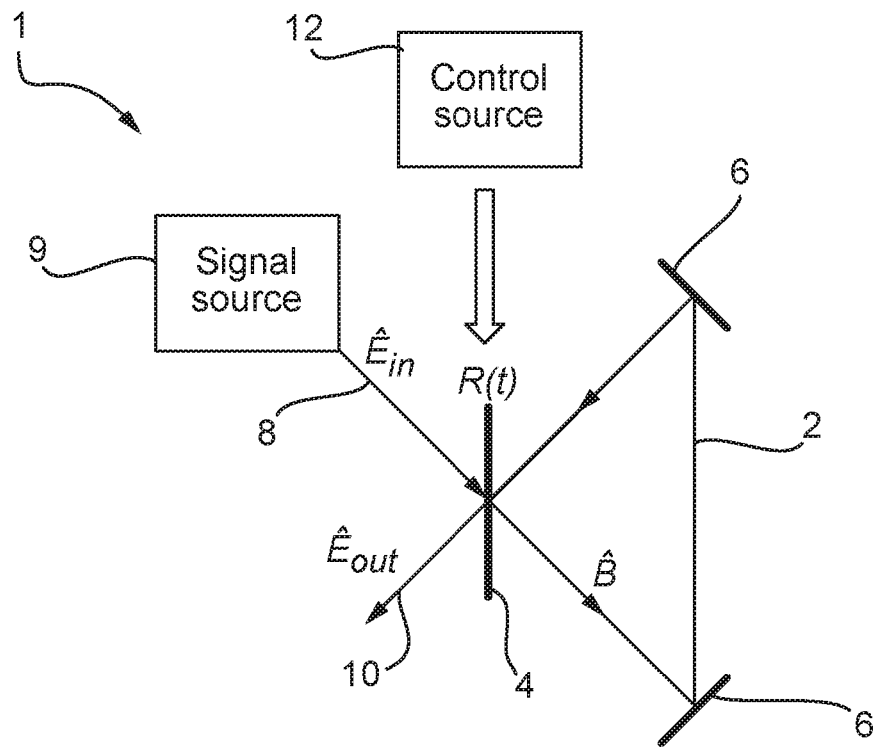
FIG. 1 shows schematically a de-multiplexer in accordance with an embodiment of the present invention.

FIG. 1 shows schematically a de-multiplexer 1 in accordance with an embodiment of the present invention. The de-multiplexer 1 includes a mode-selective optical cavity 2, having a stationary cavity mode $\hat{B}$, (which is free from parametric classical non-linear optics). The cavity 2 has an input mirror 4 that incorporates an electro-optic modulator and two other mirrors 6 that define the cavity 2.

The de-multiplexer 1 has an input 8 for directing electromagnetic radiation from a signal source 9 into the cavity 2 through the input mirror 4 and an output 10 for receiving electromagnetic radiation that is output from the cavity 2. The input 8 is arranged to direct two (or more) co-propagating modes of electromagnetic radiation $\hat{E}_{in}$ generated by the signal source 9 into the cavity 2.

Figure 2:
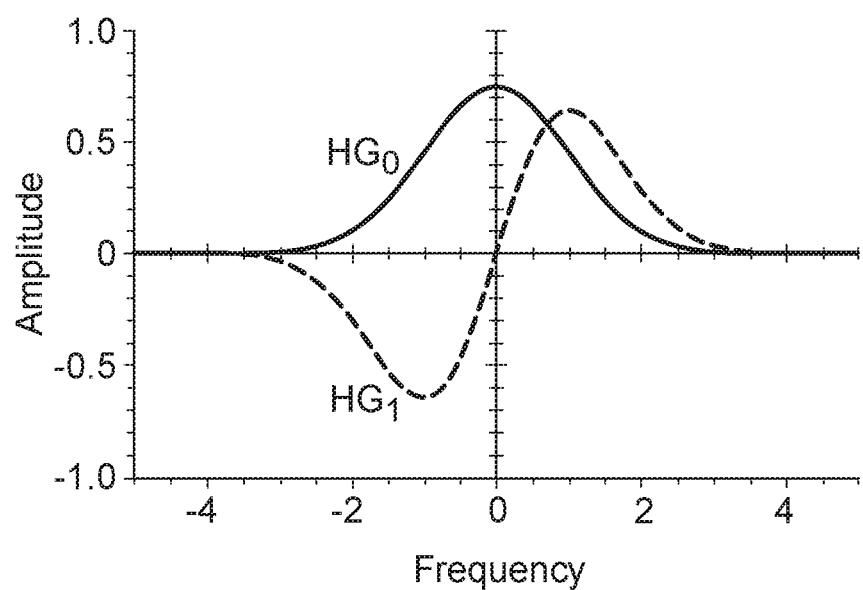
FIG. 2 shows two co-propagating modes of electromagnetic radiation for inputting into and for separation by the de-multiplexer shown in FIG. 1.

FIG. 2 shows two co-propagating modes of electromagnetic radiation for inputting into and for separation by the de-multiplexer 1 shown in FIG. 1. The two modes shown in FIG. 2, $HG_0$ and $HG_1$, are the zeroth and first order Hermite-Gauss functions. When these functions are used as the two co-propagating modes of electromagnetic radiation to be input into the cavity 2 for separation, this results in the two co-propagating modes being temporally field orthogonal to each other.

As shown in FIG. 1, the de-multiplexer 1 also includes a control source of electromagnetic radiation 12 which is arranged to generate a complex time-dependent control field R(t) to be incident upon the electro-optic modulator in the input mirror 4, in order to modulate the phase of the electromagnetic radiation incident upon the input mirror 4. Owing to the time dependency of the control field R(t), the electromagnetic radiation $\hat{E}_{out}$ output from the output 10 of the cavity comprises the two modes individually which are temporally separated, as will now be described.

Operation of the de-multiplexer will now be described with reference to FIGS. 1, 2 and 3.

Figure 3:
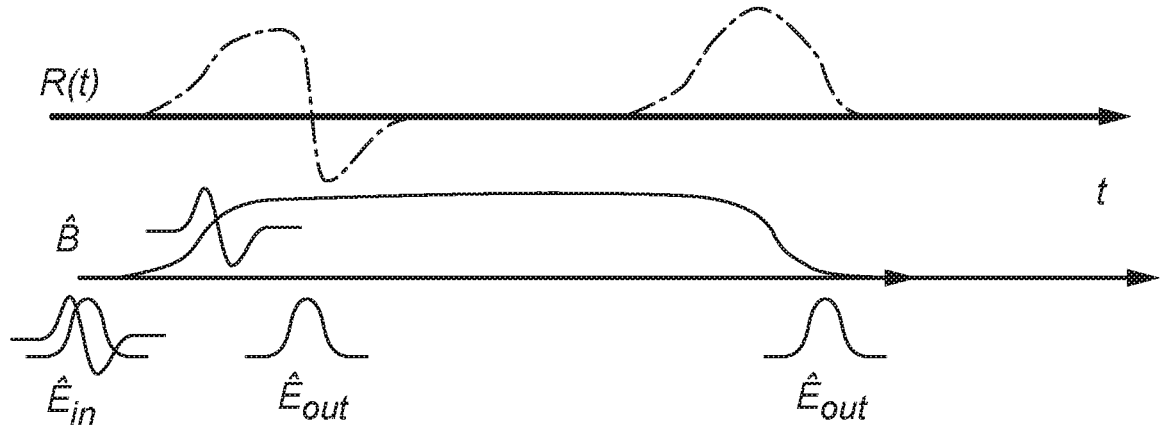
FIG. 3 shows the time dependency of a control field used with the de-multiplexer shown in FIG. 1.

FIG. 3 shows the time dependency of the control field R(t) and its effect on the two co-propagating modes of electromagnetic radiation $\hat{E}_{in}$ that are directed through the input 8 of the de-multiplexer 1 to be incident upon the input mirror 4 of the cavity 2.

In operation of the de-multiplexer 1, two co-propagating modes of electromagnetic radiation $\hat{E}_{in}$ (e.g. that have been encoded and transmitted together as a telecommunications signal) that are desired to be separated for decoding, are directed through the input 8 of the de-multiplexer 1 to be incident upon the input mirror 4 of the cavity 2. At the same time, the control source 12 generates a time-dependent control field R(t) to be incident upon the input mirror 4 such that it overlaps both spatially and contemporaneously on the input mirror 4 with the two co-propagating modes of electromagnetic radiation $\hat{E}_{in}$.

The incidence of the time-dependent control field R(t) on the input mirror 4 of the cavity 2 causes the cavity 2 to accept one of the co-propagating modes of electromagnetic radiation $\hat{E}_{in}$ (e.g. the mode $HG_1$, as shown in FIG. 3) onto the stationary mode $\hat{B}$ of the cavity 2. The other one of the co-propagating modes of electromagnetic radiation $\hat{E}_{in}$ (e.g. the mode $HG_0$, as shown in FIG. 3) is reflected from the input mirror 4 of the cavity 2 and thus output through the output 10 of the de-multiplexer 1 as a single mode of electromagnetic radiation $\hat{E}_{out}$.

After a period of time, during which the accepted mode of electromagnetic radiation is retained inside the cavity 2 (mapped onto the stationary mode $\hat{B}$ of the cavity 2) by the input mirror 4 and the two other mirrors 6 that define the cavity 2, the control field R(t) is modulated such that the accepted mode is output through the input mirror 4 of the cavity 2 and thus output through the output 10 of the de-multiplexer 1 as a single mode of electromagnetic radiation Rout.

The temporally separated output modes of electromagnetic radiation $\hat{E}_{out}$ can then be detected and decoded as appropriate.

Figure 4:
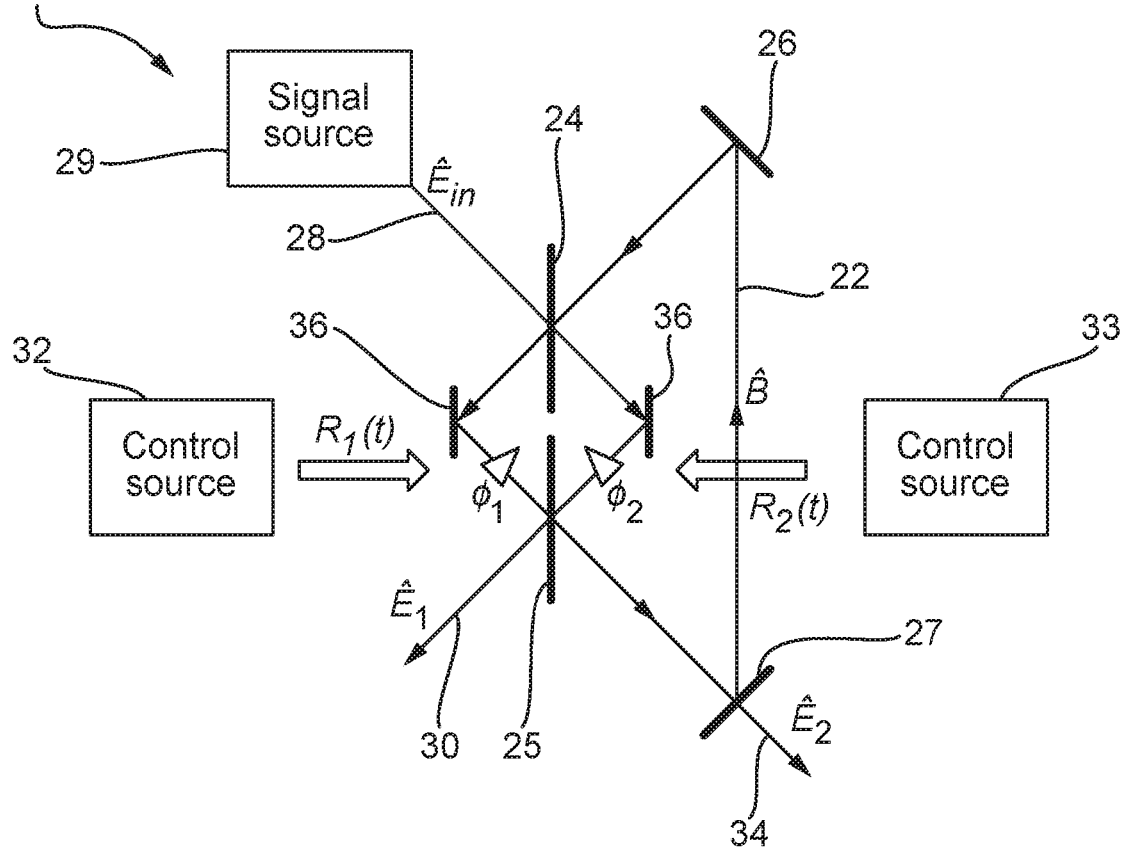
FIG. 4 shows schematically a de-multiplexer in accordance with another embodiment of the present invention.

FIG. 4 shows schematically a de-multiplexer 21 in accordance with another embodiment of the present invention. The de-multiplexer 21 shown in FIG. 4 is similar to the de-multiplexer 1 shown in FIG. 1 (i.e. in that it is based on a cavity 22 which is free from parametric classical non-linear optics), except that instead of an electro-optic modulator incorporated into the input mirror, the de-multiplexer 21 shown in FIG. 4 includes an input mirror 24, an output mirror 25 and two further mirrors 36 that define a Mach-Zehnder interferometer. The input and output mirrors 24, 25 also function as beamsplitters in the Mach-Zehnder interferometer and as part of the cavity 22.

The Mach-Zehnder interferometer includes two electro-optic modulators $\varphi_1$, $\varphi_2$ that are positioned in the arms of the Mach-Zehnder interferometer. The de-multiplexer 1 also includes two control sources of electromagnetic radiation 32, 33 which are arranged to generate complex time-dependent control fields $R_1(t)$, $R_2(t)$ to be incident upon the two electro-optic modulators $\varphi_1$, $\varphi_2$ respectively. The control fields $R_1(t)$, $R_2(t)$ are used to control the phases of electromagnetic radiation passing through the two electro-optic modulators $\varphi_1$, $\varphi_2$ respectively.

A further difference from the cavity shown in FIG. 1 is that the cavity 22 shown in FIG. 4 has a lower mirror 27 that is leaky and so is arranged to provide an output 34 for a mode of electromagnetic radiation $\hat{E}_2$. The de-multiplexer 21 also includes an output 30 that is arranged to receive the other mode of electromagnetic radiation $\hat{E}_1$ from the output mirror 25.

Owing to the time dependency of the control fields $R_1(t)$, $R_2(t)$, the electromagnetic radiation $\hat{E}_1$, $\hat{E}_2$ output from the outputs 30, 34 of the cavity 2 respectively comprises the two modes individually which are spatially separated, as will now be described.

In operation of the de-multiplexer 21, two co-propagating modes of electromagnetic radiation $\hat{E}_{in}$ (e.g. that have been generated by the signal source 29, and encoded and transmitted together as a telecommunications signal) that are desired to be separated for decoding, are directed through the input 28 of the de-multiplexer 21 to be incident upon the input mirror 24 of the cavity 22. At the same time, the control sources 32, 33 generate respective time-dependent control fields $R_1(t)$, $R_2(t)$ to be incident upon the respective electro-optic modulators $\varphi_1$, $\varphi_2$ such that they overlap both spatially and contemporaneously on the electro-optic modulators $\varphi_1$, $\varphi_2$ with the two co-propagating modes of electromagnetic radiation $\hat{E}_{in}$.

The incidence of the time-dependent control fields $R_1(t)$, $R_2(t)$ on the electro-optic modulators $\varphi_1$, $\varphi_2$ of the cavity 22 causes the cavity 22 to accept one of the co-propagating modes of electromagnetic radiation $\hat{E}_{in}$ onto the stationary mode $\hat{B}$ of the cavity 22. The other one of the co-propagating modes of electromagnetic radiation $\hat{E}_{in}$ is thus output by the Mach-Zehnder interferometer through the output mirror 25 where it is received by the output 30 of the de-multiplexer 21 as a single mode of electromagnetic radiation $\hat{E}_1$.

The accepted mode of electromagnetic radiation that is mapped onto the stationary mode $\hat{B}$ of the cavity 22 by the action of the electro-optic modulators $\varphi_1$, $\varphi_2$ in the Mach-Zehnder interferometer is retained in the cavity 22 by the cavity mirrors 26, 27. However, owing to leaky lower mirror 27, the accepted mode leaks out through the mirror 27 where it is received by the other output 34 of the de-multiplexer 21 as a single mode of electromagnetic radiation $\hat{E}_1$. As the two different output modes $\hat{E}_1$, $\hat{E}_2$ are output through different outputs 30, 34, owing to the action of the electro-optic modulators $\varphi_1$, $\varphi_2$ driven by the control fields $R_1(t)$, $R_2(t)$, the two co-propagating modes of electromagnetic radiation $\hat{E}_{in}$ input into the de-multiplexer 21 have thus been separated spatially.

The spatially separated output modes of electromagnetic radiation modes $\hat{E}_1$, $\hat{E}_2$ can then be detected and decoded as appropriate.

Figure 5:
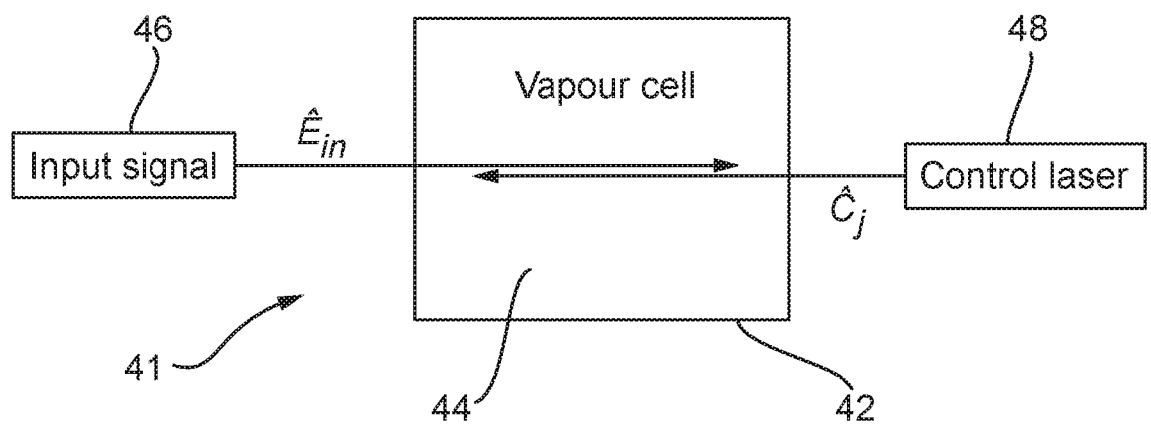
FIGS. 5 and 6 show schematically a quantum memory de-multiplexer according to an embodiment of the present invention.

A further embodiment of a de-multiplexer that is implemented using a quantum memory device will now be described. FIG. 5 is a diagram showing schematically a quantum memory de-multiplexer 41 according to an embodiment of the present invention.

The quantum memory de-multiplexer 41 includes a vapour cell 42 containing an atomic ensemble 44, e.g. of rubidium or caesium atoms. The quantum memory de-multiplexer 41 also includes an input signal 46 (for inputting two co-propagating modes of electromagnetic radiation $\hat{E}_{in}$) and a control laser 48 that acts as a control field source of pulsed near-infrared radiation $\hat{C}_j$ to be incident upon the atomic ensemble 44 within the vapour cell 42.

Figure 6:
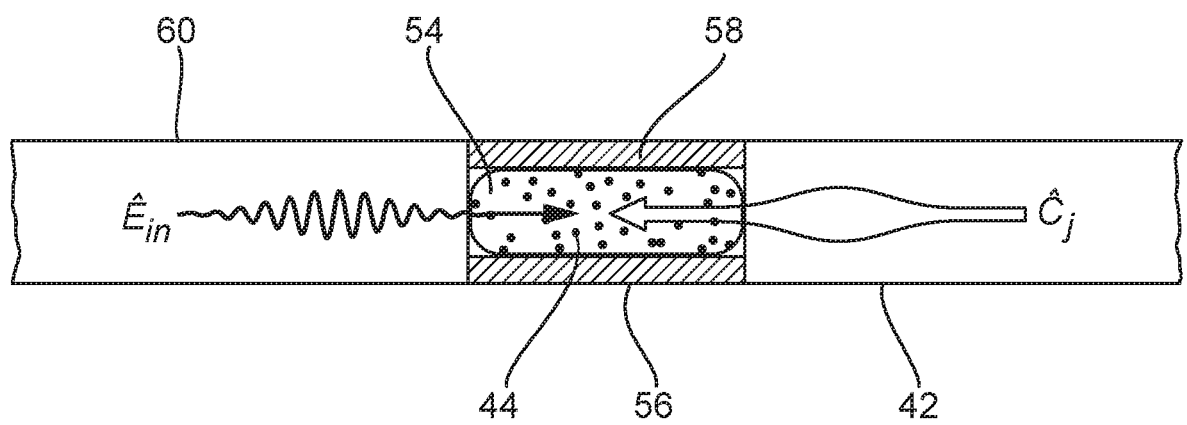

FIG. 6 shows the vapour cell 42 shown in FIG. 5 in more detail. The vapour cell 42 is formed as a hollow core 54 that contains the atomic ensemble 44 within a photonic crystal fibre 56 having a lattice 58 surrounding the hollow core 54. The photonic crystal fibre 56 containing the hollow core 54 is spliced into an optical fibre 60. The optical fibre 60 is connected at either end to the input signal 46 and the control laser 48 to enable them to direct their radiation $\hat{E}_{in}$, $\hat{C}_j$ so to be incident upon the atomic ensemble 44 with the vapour cell 42.

Figure 7:
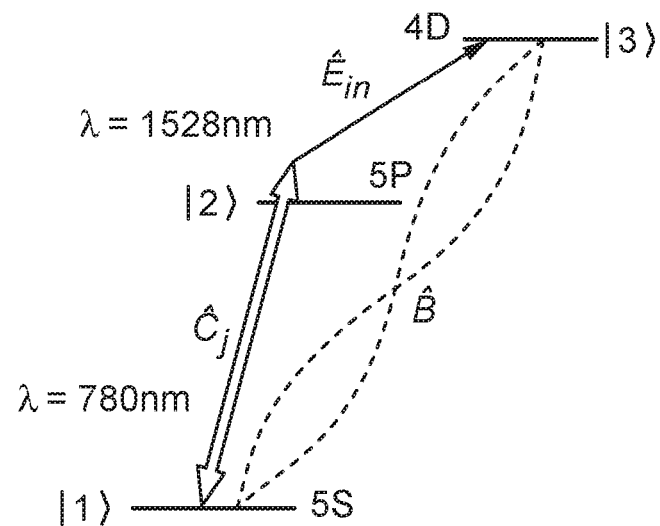
FIG. 7 shows an atomic level scheme used in an embodiment of the quantum memory de-multiplexer shown in FIGS. 5 and 6.
Figure 8:
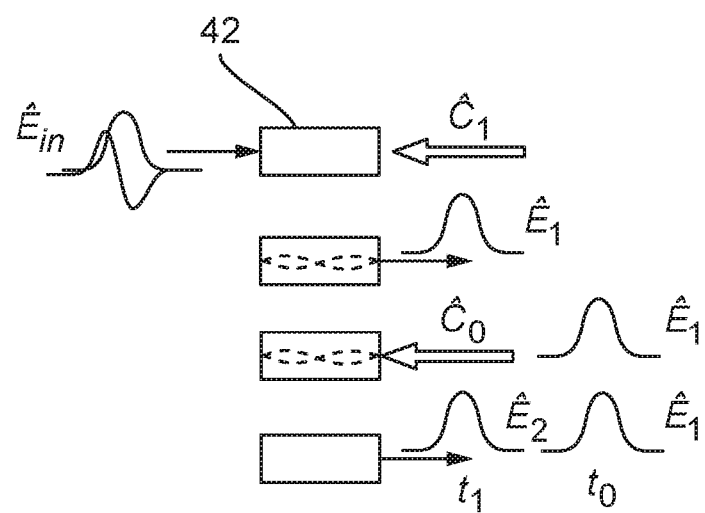
FIG. 8 shows schematically two co-propagating modes of electromagnetic radiation being separated by the quantum memory de-multiplexer shown in FIGS. 5 and 6.

Operation of the quantum memory de-multiplexer 41 shown in FIGS. 5 and 6 will now be described with reference to FIGS. 7 and 8. FIG. 7 shows a specific example of an atomic level scheme used in the quantum memory de-multiplexer 41 shown in FIGS. 5 and 6, when the vapour cell 42 contains an atomic ensemble 44 of rubidium atoms. FIG. 8 shows schematically two co-propagating modes of electromagnetic radiation being separated by the quantum memory de-multiplexer 41 shown in FIGS. 5 and 6.

The optical fibre 60 is prepared with the crystal fibre 56 spliced into it and containing an atomic ensemble 44 of rubidium atoms in the hollow core 54 of the crystal fibre 56 that forms the vapour cell 42. The optical fibre 60 is connected between the input signal 46 (which generates the two co-propagating modes of electromagnetic radiation $\hat{E}_{in}$ at a wavelength of 1528 nm (corresponding to a frequency of 196 THz)) and the control laser 48 having a wavelength of 780 nm (corresponding to a frequency of 384 THz).

The two co-propagating modes of electromagnetic radiation $\hat{E}_{in}$ generated by the input signal 46 is thus arranged to stimulate the 1528 nm 5P-4D transition of the atomic valence electrons in the rubidium atomic ensemble 44, and the electromagnetic radiation $\hat{C}_j$ of the control field generated by the control laser 48 is arranged to stimulate the 780 nm 5S-5P transition of the atomic valence electrons in the rubidium atomic ensemble 44. However, the electromagnetic radiation $\hat{E}_{in}$, $\hat{C}_j$ generated by the input signal 46 and the control laser 48 respectively is arranged to be detuned from the 5S-5P and 5P-4D transitions respectively by up to 1 THz, but such that the combined application of the electromagnetic radiation $\hat{E}_{in}$, $\hat{C}_j$ of one of the two co-propagating modes and the control field is resonant with the two-photon 5S-4D transition $\hat{B}$.

Therefore, when the two co-propagating modes of electromagnetic radiation $\hat{E}_{in}$ and a first pulse of the control field $\hat{C}_1$ are incident contemporaneously on the atomic ensemble 44 (stimulating the 5P-4D and 5S-5P transitions of the rubidium atomic ensemble 44 respectively), the control field $\hat{C}_1$ and one of the two co-propagating modes of electromagnetic radiation $\hat{E}_{in}$ create a coherent excitation of the two-photon 5S-4D transition $\hat{B}$. This has the effect of "storing" the one of the two co-propagating modes of electromagnetic radiation $\hat{E}_2$ and allowing the other of the two co-propagating modes of electromagnetic radiation $\hat{E}_2$ to pass through the atomic ensemble 44 in the vapour cell 42 such that it is output as a single mode of electromagnetic radiation $\hat{E}_1$ at time $t_0$ (as shown in FIG. 8).

To retrieve the stored mode of electromagnetic radiation $\hat{E}_2$ from the atomic ensemble 44, a further pulse of the control field $\hat{C}_0$ is generated by the control laser 48 to be incident upon the atomic ensemble 44. This control pulse Co stimulates the 5S-5P transition, causing the emission of the stored mode of electromagnetic radiation $\hat{E}_2$ from the atomic ensemble 44 at a time $t_1$ (as shown in FIG. 8).

The temporally separated output modes of electromagnetic radiation $\hat{E}_1$, $\hat{E}_2$ can then be detected and decoded as appropriate.

Figure 9:
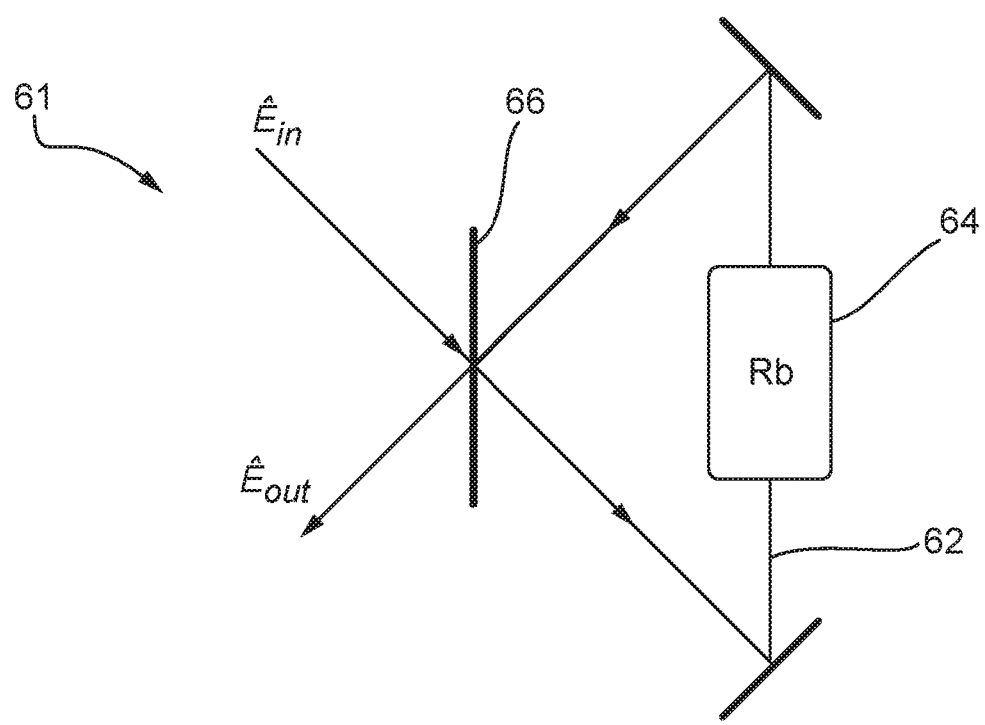
FIG. 9 shows schematically a quantum memory de-multiplexer according to another embodiment of the present invention.

FIG. 9 shows schematically a quantum memory de-multiplexer according to another embodiment of the present invention.

In the de-multiplexer 61 shown in FIG. 9, the atomic ensemble 62 is placed inside a cavity 64. The two co-propagating modes of electromagnetic radiation $\hat{E}_{in}$ to be separated are input through a mirror 66 of the cavity, with the temporally separated output modes $\hat{E}_{out}$ being output through the same mirror 66.

In operation, the quantum memory de-multiplexer 61 shown in FIG. 9 operates in the same manner as the embodiment shown in FIGS. 5-8, except that the cavity 64 helps to increase the coupling of the control field and the one of the two co-propagating modes of electromagnetic radiation to the respective transitions of the atomic valence electrons of the atomic ensemble.

FIG. 10 shows schematically a de-multiplexer 71 used in combination with a mode converter 72 according to another embodiment of the present invention.

The de-multiplexer 71 (which may be any of the quantum memory de-multiplexers according to the embodiments shown in FIGS. 5-10) is used as described above, to separate two co-propagating modes of electromagnetic radiation $\hat{E}_{in}$ into two temporally separate output modes of electromagnetic radiation $\hat{E}_1$, $\hat{E}_2$. For example, one of the output modes $\hat{E}_1$ may correspond to the mode $HG_0$ shown in FIG. 2 and the other of the output modes $\hat{E}_2$ may correspond to the mode $HG_1$ shown in FIG. 2.

The mode converter 72 is configured in the same way as the de-multiplexer 71, except that only a single mode of electromagnetic radiation $\hat{E}_2$ is input to be accepted into the atomic ensemble. Thus the mode converter 72 is positioned relative to the de-multiplexer 71 so that one of the output modes of electromagnetic radiation $\hat{E}_2$ is received by and input into the mode converter 72. The control field $\hat{C}_j$ is shaped and used, with the mode of electromagnetic radiation $\hat{E}_2$ input into the mode converter 72 to create a coherent excitation of the atomic ensemble of the mode converter 72 such that the mode of electromagnetic radiation $\hat{E}_2$ is stored in the atomic ensemble of the mode converter 72. In the same manner as for the de-multiplexer, the control field $\hat{C}_j$ is subsequently shaped and caused to be incident upon the atomic ensemble of the mode converter 72 such that the mode of electromagnetic radiation $\hat{E}_2$ is output as a different mode of electromagnetic radiation, e.g. corresponding to the mode $HG_0$ shown in FIG. 2.

Therefore the combination of the de-multiplexer 71 and the mode converter 72 can be used to separate two co-propagating modes of electromagnetic radiation $\hat{E}_{in}$ into two temporally separate output modes of electromagnetic radiation which are described by the same functional (e.g. Hermite-Gauss) mode.

It can be seen from the above that, at least in preferred embodiments, the invention provides a de-multiplexing device that is able to separate temporal field orthogonal modes of electromagnetic radiation temporally and/or spatially, owing to the mode selective time-dependent control field acting on the volume in a way that is free from parametric classical non-linear optics. Thus the de-multiplexer allows such temporal field orthogonal modes to be used for encoding data for telecommunications, for example. This helps to open up more space for the encoding of data, thus enabling such modes to be able to pack more data into the existing telecommunication bands, for example, and may be compatible with dense wavelength division multiplexing (DWDM).

The invention claimed is:

1. A de-multiplexer for separating two co-propagating modes of electromagnetic radiation, wherein the electric fields of the two modes of electromagnetic radiation are orthogonal to each other, wherein the de-multiplexer comprises:
    a volume comprising a path therethrough for receiving electromagnetic radiation, wherein the volume comprises an atomic ensemble or an optical cavity, wherein the optical cavity is coupled to an electro-optic modulator;
    an input for directing two co-propagating modes of electromagnetic radiation to be incident upon the volume, wherein the electric fields of the two modes of electromagnetic radiation are orthogonal to each other;
    a control source of optical or microwave electromagnetic radiation arranged to generate a time-dependent control field, wherein the time-dependent control field from the control source is arranged to be incident upon the atomic ensemble or electro-optic modulator and to overlap both contemporaneously and spatially with the two co-propagating modes of electromagnetic radiation;
    wherein the volume is arranged and the time-dependent control field is shaped such that, when the two co-propagating modes of electromagnetic radiation and the time-dependent control field are incident upon the atomic ensemble or electro-optic modulator contemporaneously, the time-dependent control field causes the volume to accept one of the two modes of electromagnetic radiation onto a mode of the volume without any parametric non-linear optical interaction taking place and to reflect or transmit the other of the two modes of electromagnetic radiation, so to spatially and/or temporally separate the two modes of electromagnetic radiation from each other.

2. A de-multiplexer as claimed in claim 1, wherein the two co-propagating modes of electromagnetic radiation comprise temporal field orthogonal modes.

3. A de-multiplexer as claimed in claim 1, wherein the two co-propagating modes of electromagnetic radiation have a frequency between 1 GHz and 400 THz.

4. A de-multiplexer as claimed in claim 1, wherein the mode of the volume is a stationary mode of the volume and the one of the two co-propagating modes of electromagnetic radiation is accepted onto the stationary mode of the volume.

5. A de-multiplexer as claimed in claim 1, wherein the control source is arranged to direct the control field in a direction collinear with the two co-propagating modes of electromagnetic radiation.

6. A de-multiplexer as claimed in claim 1, wherein the bandwidth of the control field is greater than the bandwidth of the two co-propagating modes of electromagnetic radiation.

7. A de-multiplexer as claimed in claim 1, wherein the time-dependent control field comprises a complex control field.

8. A de-multiplexer as claimed in claim 1, wherein the control source is arranged to modulate the control field when the two co-propagating modes of electromagnetic radiation are incident upon the atomic ensemble or electro-optic modulator.

9. A de-multiplexer as claimed in claim 1, wherein the control source is arranged to shape and direct the time-dependent control field to be incident upon the atomic ensemble or electro-optic modulator to output the accepted mode of electromagnetic radiation from the volume.

10. A de-multiplexer as claimed in claim 1, wherein the volume comprises the optical cavity, and electro-optic modulator is arranged to be controlled by the control field, wherein the control field and the two co-propagating modes of electromagnetic radiation are arranged to be incident upon the electro-optic modulator, and wherein the electro-optic modulator is arranged to modulate the two co-propagating modes such that one of the two modes of electromagnetic radiation is accepted into the optical cavity and the other of the two modes of electromagnetic radiation is reflected from or transmitted through the optical cavity.

11. A de-multiplexer as claimed in claim 10, wherein the bandwidth of the electro-optic modulator is greater than the bandwidth of the two co-propagating modes of electromagnetic radiation.

12. A de-multiplexer as claimed in claim 10, wherein the optical cavity comprises two electro-optic modulators arranged in an interferometer, and wherein the control source of electromagnetic radiation is arranged to generate two time-dependent control fields, wherein the two time-dependent control fields are arranged to be incident upon the two electro-optic modulators respectively and to overlap contemporaneously and spatially with the two co-propagating modes of electromagnetic radiation.

13. A de-multiplexer as claimed in claim 1, wherein the volume comprises the atomic ensemble,
wherein the atomic ensemble comprises atomic valence electrons having a first state, a second state and a third state;
wherein the second state has a higher energy than, and is linked to, the first state by an atomic transition, and the third state has a higher energy than, and is linked to, the second state by an atomic transition;
wherein one of the two co-propagating modes is arranged to stimulate transitions of the atomic valence electrons in the atomic ensemble between the first state and the second state or between the second state and the third state and the control field is arranged to be incident upon the atomic ensemble to stimulate transitions of the atomic valence electrons in the atomic ensemble between the second state and the third state or between the first state and the second state;
and wherein the atomic ensemble is arranged such that on incidence of the one of the two co-propagating modes of electromagnetic radiation and the control field to the atomic ensemble, a coherent excitation of the transition between the first state and the third state is created, such that the atomic ensemble accepts one of the two co-propagating modes of electromagnetic radiation into the atomic ensemble and transmits the other of the two modes of electromagnetic radiation through the atomic ensemble.

14. A de-multiplexer as claimed in claim 13, wherein the atomic ensemble comprises rubidium atoms; the first state is the 5S state of rubidium, the second state is the 5P state of rubidium and the third state is the 4D state of rubidium.

15. A method of separating two co-propagating modes of electromagnetic radiation, wherein the electric fields of the two modes of electromagnetic radiation are orthogonal to each other, wherein the method comprises:
directing two co-propagating modes of electromagnetic radiation to be incident upon a volume, wherein the volume comprises an atomic ensemble or an optical cavity, wherein the optical cavity is coupled to an electro-optic modulator,
wherein the electric fields of the two modes of electromagnetic radiation are orthogonal to each other and the volume comprises a path therethrough for receiving electromagnetic radiation;
shaping and directing a time-dependent control field of optical or microwave electromagnetic radiation to be incident upon the atomic ensemble or electro-optic modulator and to overlap both contemporaneously and spatially with the two co-propagating modes of electromagnetic radiation;
wherein the volume is arranged and the time-dependent control field is shaped such that, when the two co-propagating modes of electromagnetic radiation and the time-dependent control field are incident upon the atomic ensemble or electro-optic modulator contemporaneously, the time-dependent control field causes the volume to accept one of the two modes of electromagnetic radiation onto a mode of the volume without any parametric non-linear optical interaction taking place and to reflect or transmit the other of the two modes of electromagnetic radiation, so to spatially and/or temporally separate the two modes of electromagnetic radiation from each other.

16. A method as claimed in claim 15, comprising modulating the control field when the two co-propagating modes of electromagnetic radiation are incident upon the volume.

17. A method as claimed in claim 15, comprising shaping and directing the time-dependent control field to be incident upon the volume to output the accepted mode of electromagnetic radiation from the volume.

18. A method as claimed in claim 15, wherein the volume comprises the optical cavity, and the electro-optic modulator, wherein the method comprises directing the control field to be incident upon the electro-optic modulator to control the electro-optic modulator, directing the two co-propagating modes of electromagnetic radiation be incident upon the electro-optic modulator, and shaping the control field to control the electro-optic modulator to modulate the two co-propagating modes such that one of the two modes of electromagnetic radiation is accepted into the optical cavity and the other of the two modes of electromagnetic radiation is reflected from or transmitted through the optical cavity.

19. A method as claimed in claim 15, wherein the volume comprises the atomic ensemble,
wherein the atomic ensemble comprises atomic valence electrons having a first state, a second state and a third state;
wherein the second state has a higher energy than, and is linked to, the first state by an atomic transition, and the third state has a higher energy than, and is linked to, the second state by an atomic transition;
wherein the method comprises stimulating transitions of the atomic valence electrons in the atomic ensemble between the first state and the second state or between the second state and the third state by arranging one of the two co-propagating modes to be incident upon the atomic ensemble, and stimulating transitions of the atomic valence electrons in the atomic ensemble between the second state and the third state or between the first state and the second state by arranging the control field to be incident upon the atomic ensemble;
and wherein the atomic ensemble is arranged such that on incidence of the one of the two co-propagating modes of electromagnetic radiation and the control field to the atomic ensemble, a coherent excitation of the transition between the first state and the third state is created, such that the atomic ensemble accepts one of the two co-propagating modes of electromagnetic radiation into the atomic ensemble and transmits the other of the two modes of electromagnetic radiation through the atomic ensemble.

20. A mode converter for converting a mode of electromagnetic radiation from a first mode to a second mode, the mode converter comprising:
an atomic ensemble comprising atomic valence electrons having a first state, a second state and a third state, wherein the second state has a higher energy than, and is linked to, the first state by one or more atomic transitions, and the third state has a higher energy than, and is linked to, the second state by an atomic transition;

a signal source of electromagnetic radiation arranged to generate a first mode of electromagnetic radiation having a frequency corresponding to an off-resonant atomic transition between the second state and the third state of atomic valence electrons in the atomic ensemble, wherein the first mode of electromagnetic radiation from the signal source is arranged to be incident upon the atomic ensemble to stimulate off-resonant transitions of the atomic valence electrons in the atomic ensemble between the second state and the third state, and wherein the signal source electromagnetic radiation has a bandwidth of greater than 1 GHz;

one or more control sources of electromagnetic radiation each arranged to generate electromagnetic radiation having a frequency corresponding to an off-resonant atomic transition from the one or more atomic transitions linking the first state and the second state of atomic valence electrons in the atomic ensemble, wherein the electromagnetic radiation from the one or more control sources is arranged to be incident upon the atomic ensemble to stimulate off-resonant transitions of the atomic valence electrons in the atomic ensemble between the first state and the second state, and wherein the electromagnetic radiation from each of the one or more control sources has a bandwidth of greater than 1 GHz; and wherein the mode converter is arranged such that on incidence of the first mode of electromagnetic radiation from the signal source and electromagnetic radiation from each of the one or more control sources to the atomic ensemble, a coherent excitation of the transition between the first state and the third state is created that stores the first mode of electromagnetic radiation from the signal source in the atomic ensemble;

wherein the one or more control sources are each arranged to shape the electromagnetic radiation from each of the one or more control sources such that the subsequent incidence of electromagnetic radiation from each of the one or more control sources upon the atomic ensemble stimulates emission of a second mode of electromagnetic radiation from the atomic ensemble such that the first mode of electromagnetic radiation is converted in the second mode of electromagnetic radiation; and wherein the second mode of electromagnetic radiation has substantially the same frequency as the first mode of electromagnetic radiation and the second mode of electromagnetic radiation is a different functional mode than the first mode of electromagnetic radiation.

* * * * *